(12) United States Patent
Pandey et al.

(10) Patent No.: US 11,888,205 B2
(45) Date of Patent: Jan. 30, 2024

(54) POLARIZED ELECTROMAGNETIC DEVICE

(71) Applicant: Rogers Corporation, Chandler, AZ (US)

(72) Inventors: Shailesh Pandey, Woburn, MA (US); Kristi Pance, Auburndale, MA (US); Roshin Rose George, Burlington, MA (US); Gianni Taraschi, Arlington, MA (US)

(73) Assignee: ROGERS CORPORATION, Chandler, AZ (US)

( * ) Notice: Subject to any disclaimer, the term of this patent is extended or adjusted under 35 U.S.C. 154(b) by 293 days.

(21) Appl. No.: 17/160,897

(22) Filed: Jan. 28, 2021

(65) Prior Publication Data

US 2021/0242555 A1 Aug. 5, 2021

Related U.S. Application Data

(60) Provisional application No. 62/968,174, filed on Jan. 31, 2020.

(51) Int. Cl.
*H01Q 1/38* (2006.01)
*H01P 3/16* (2006.01)
(Continued)

(52) U.S. Cl.
CPC .............. *H01P 3/16* (2013.01); *G02B 6/1228* (2013.01); *H01P 5/028* (2013.01); *H01Q 9/045* (2013.01); *H01Q 9/0485* (2013.01)

(58) Field of Classification Search
CPC ........ H01Q 1/38; H01Q 9/045; H01Q 9/0485; H01Q 9/0492; H01Q 13/106; H01Q 21/061; H01Q 21/065
See application file for complete search history.

(56) References Cited

U.S. PATENT DOCUMENTS

| | | | | |
|---|---|---|---|---|
| 5,181,042 A | * | 1/1993 | Kaise | ................ H01Q 21/0075 343/872 |
| 7,692,588 B2 | * | 4/2010 | Beer | ...................... H01L 24/19 257/690 |

(Continued)

FOREIGN PATENT DOCUMENTS

CN 110649383 A 1/2020

OTHER PUBLICATIONS

Abdelhady M A et al., "Circularly Polarized Chamfer-shaped DRA Array," IEEE 2017 34th National Radio Science Conference (NRSC), Mar. 13, 2017, pp. 38-42, XP033084277, DOI: 10.1109/NRSC.2017.7893474.

(Continued)

*Primary Examiner* — Tung X Le
(74) *Attorney, Agent, or Firm* — CANTOR COLBURN LLP

(57) ABSTRACT

An electromagnetic device includes: a substrate having an elongated aperture having an overall length, L, and an overall width, W, as observed in a plan view of the device, where L>W; a dielectric medium having a dielectric material other than air disposed on the substrate substantially covering the aperture, the dielectric medium having a cross sectional boundary as viewed in the plan view of the device, the cross sectional boundary having at least one recessed portion that recesses inward toward the aperture from a tangent line that partially bounds the cross sectional boundary; wherein the length L is not perpendicular to the tangent line.

27 Claims, 32 Drawing Sheets

(51) Int. Cl.
*H01P 5/02* (2006.01)
*G02B 6/122* (2006.01)
*H01Q 9/04* (2006.01)

(56) References Cited

U.S. PATENT DOCUMENTS

| | | | | |
|---|---|---|---|---|
| 9,118,107 | B2* | 8/2015 | Rofougaran | H01Q 21/064 |
| 9,225,070 | B1* | 12/2015 | Zeweri | H01Q 21/24 |
| 9,748,645 | B2* | 8/2017 | Mohamadi | H01Q 21/0031 |
| 2012/0306713 | A1* | 12/2012 | Raj | H01Q 9/0485 |
| | | | | 343/785 |
| 2015/0380824 | A1* | 12/2015 | Tayfeh Aligodarz | ......... |
| | | | | H01Q 15/0066 |
| | | | | 430/319 |
| 2017/0271772 | A1* | 9/2017 | Miraftab | H01Q 9/0485 |
| 2018/0115072 | A1* | 4/2018 | Pance | H01Q 21/061 |
| 2020/0227827 | A1* | 7/2020 | Vollmer | H01Q 21/061 |

OTHER PUBLICATIONS

Amin, Muhammed et al., "A bowtie-shaped MIMO dielectric resonator antenna for WLAN applications," IEICE Electronics Express, vol. 14, No. 12, pp. 1-6, DOI: 10.1587/elex.14.20170519.

International Search Report and Second Written Opinion for International Application No. PCT/US2021/015690; International dated Jan. 29, 2021; dated Jul. 22, 2021; 34 pages.

Thamae, Leboli Z. et al., "Broadband Bowtie Dielectric Resonator," IEEE Transactions on Antennas and Propagation, 2010, vol. 58, No. 11 (2010-11-01), pp. 3707-3710.

Xie, Rensheng et al. "A Compact Multi-Band Dielectric Resonator Antenna Loaded with CSRRs for Communication Systems," 2016 10th International Congress on Advanced Electromagnetic Materials in Microwaves and Optics (Metamaterials), Sep. 19, 2016, pp. 421-423, XP033006560, DOI: 10.1109/METAMATERIALS.2016.7746422.

Zhou, Yao-Dong et al. "A Novel Single-Fed Wide Dual-Band Circularly Polarized Dielectric Resonator Antenna," IEEE Antennas and Wireless Propagation Letters, vol. 15, Sep. 23, 2015, pp. 930-933, XP011604480, ISSN: 1536-1225, DOI: 10.1109/LAWP.2015.2481462.

* cited by examiner

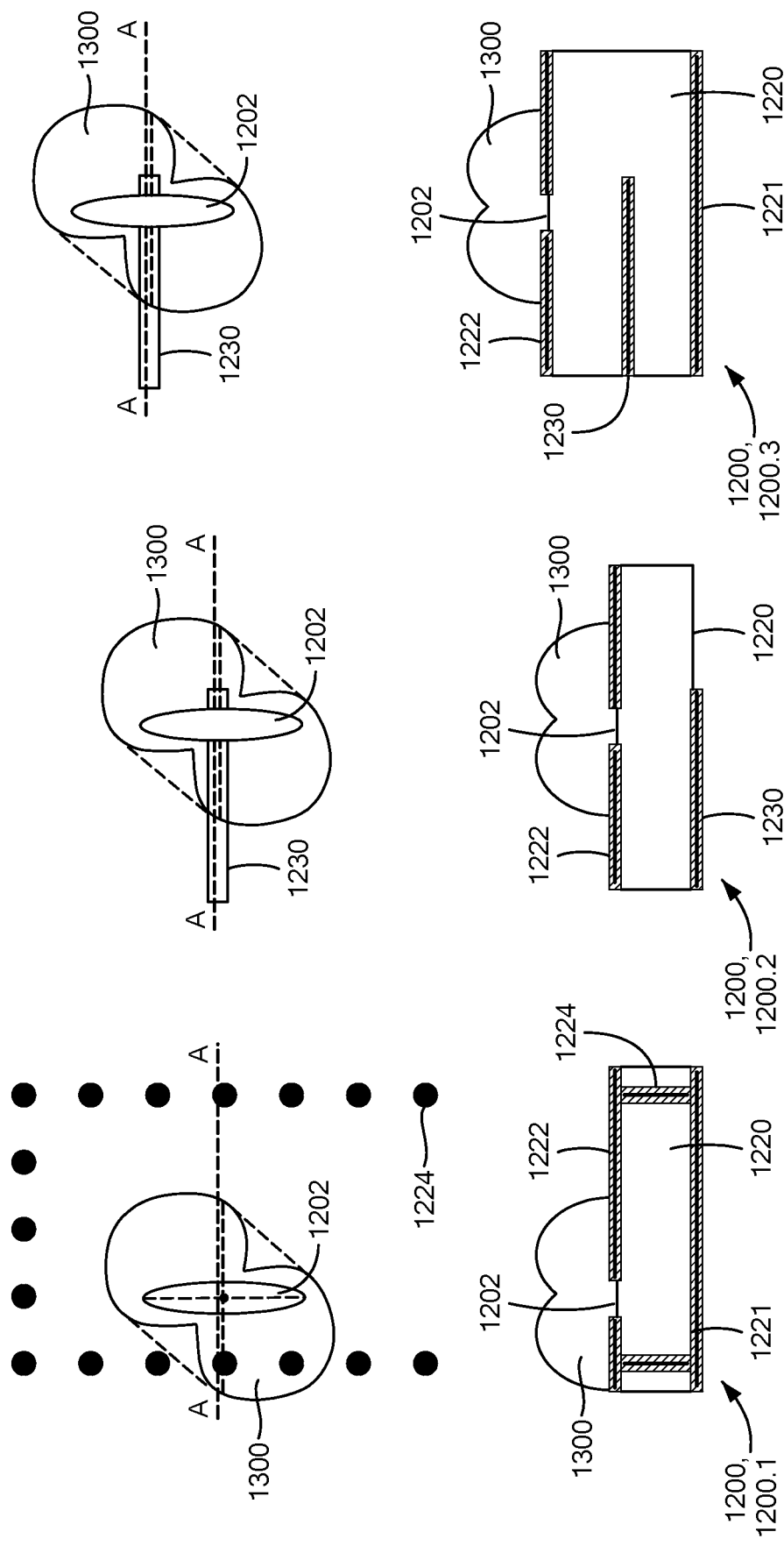

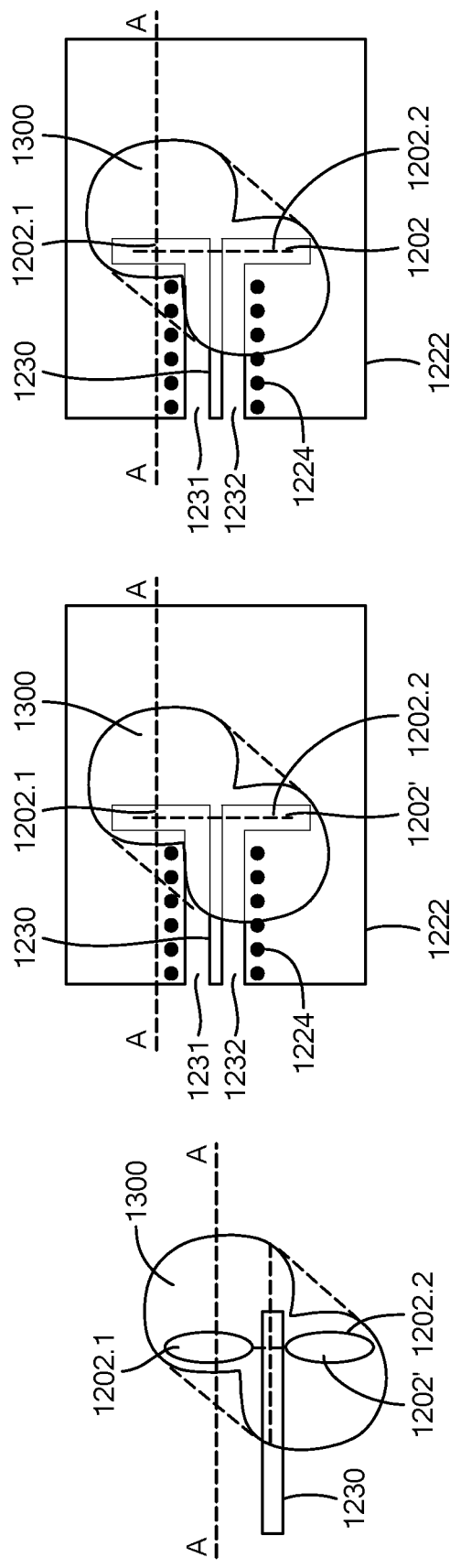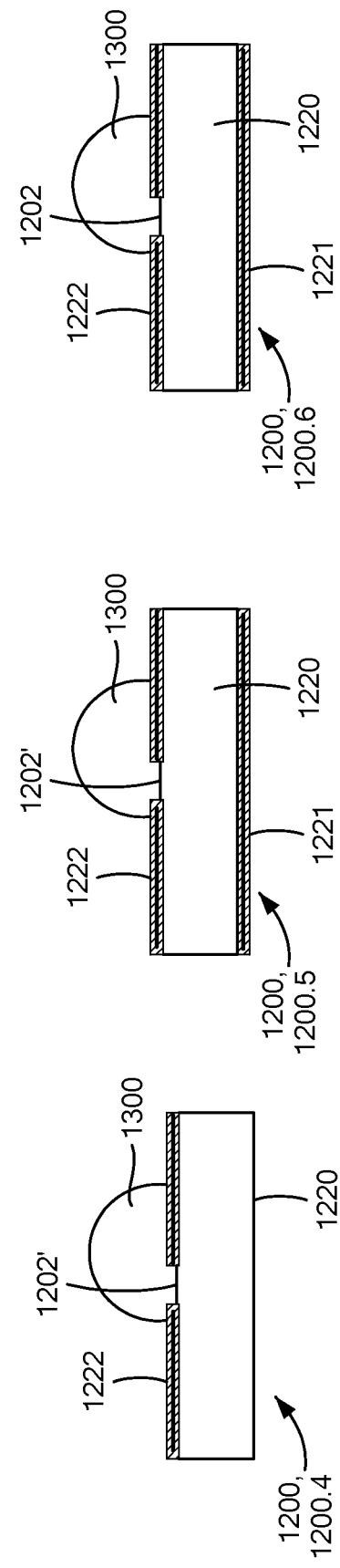
FIG. 1F  FIG. 1G  FIG. 1H

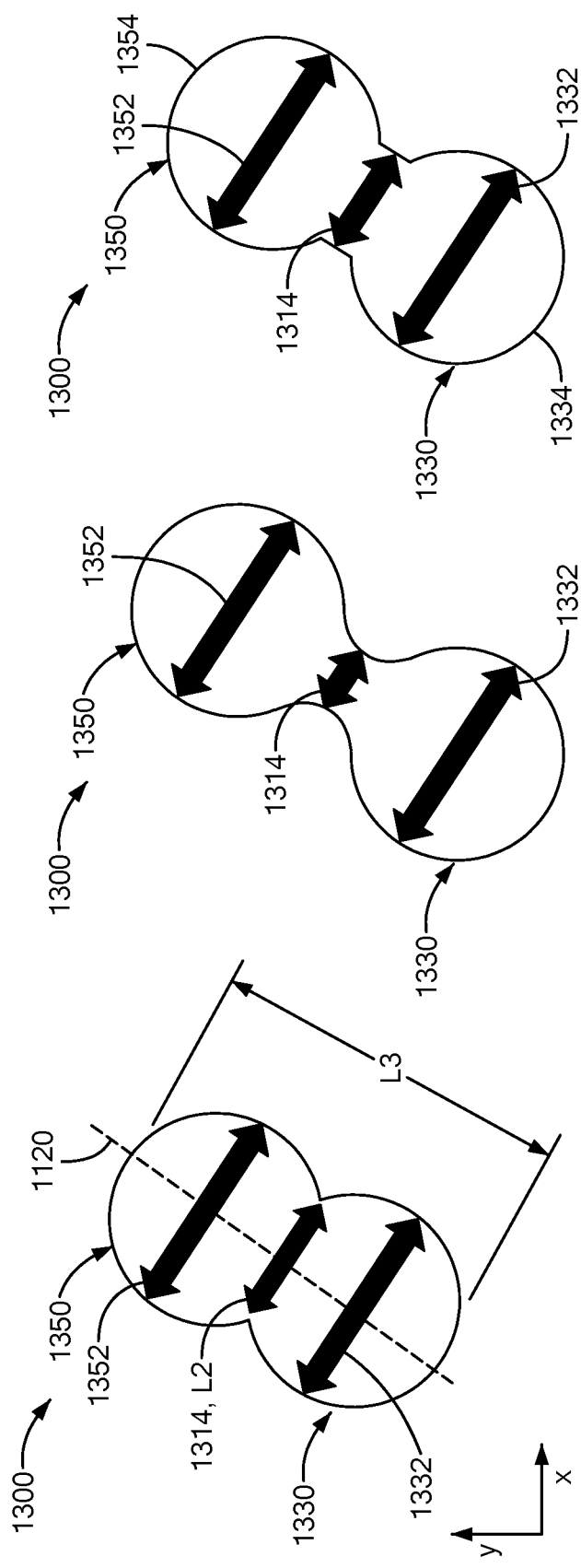

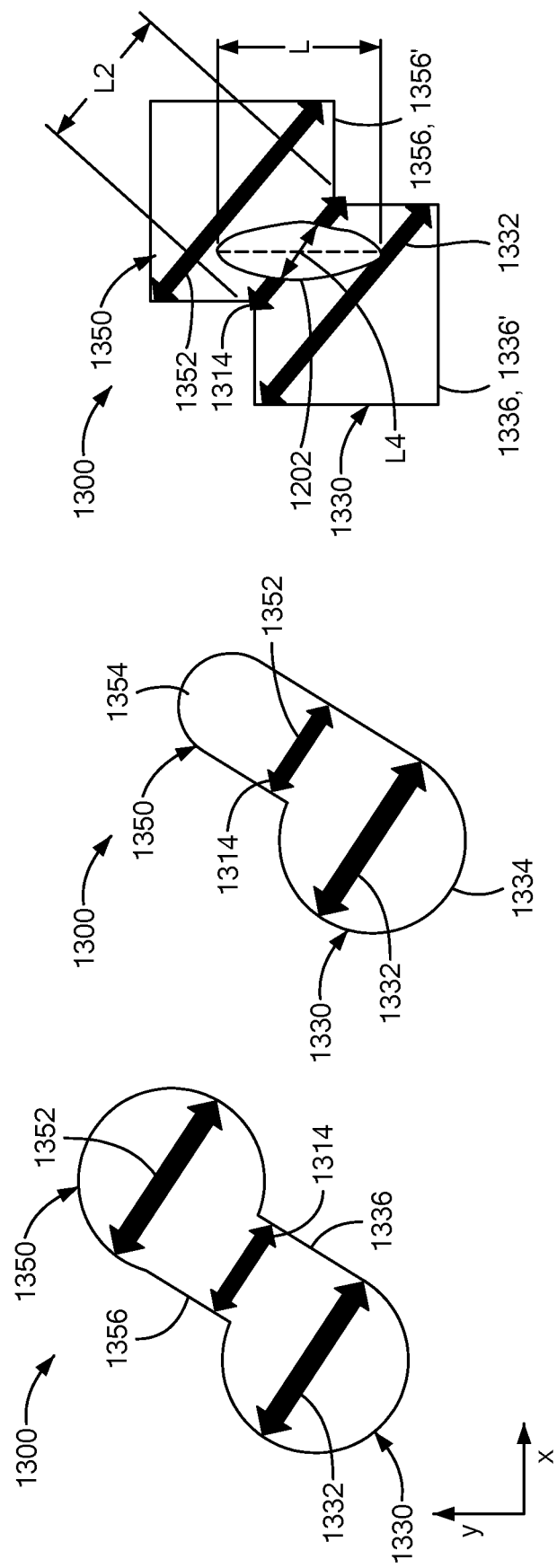

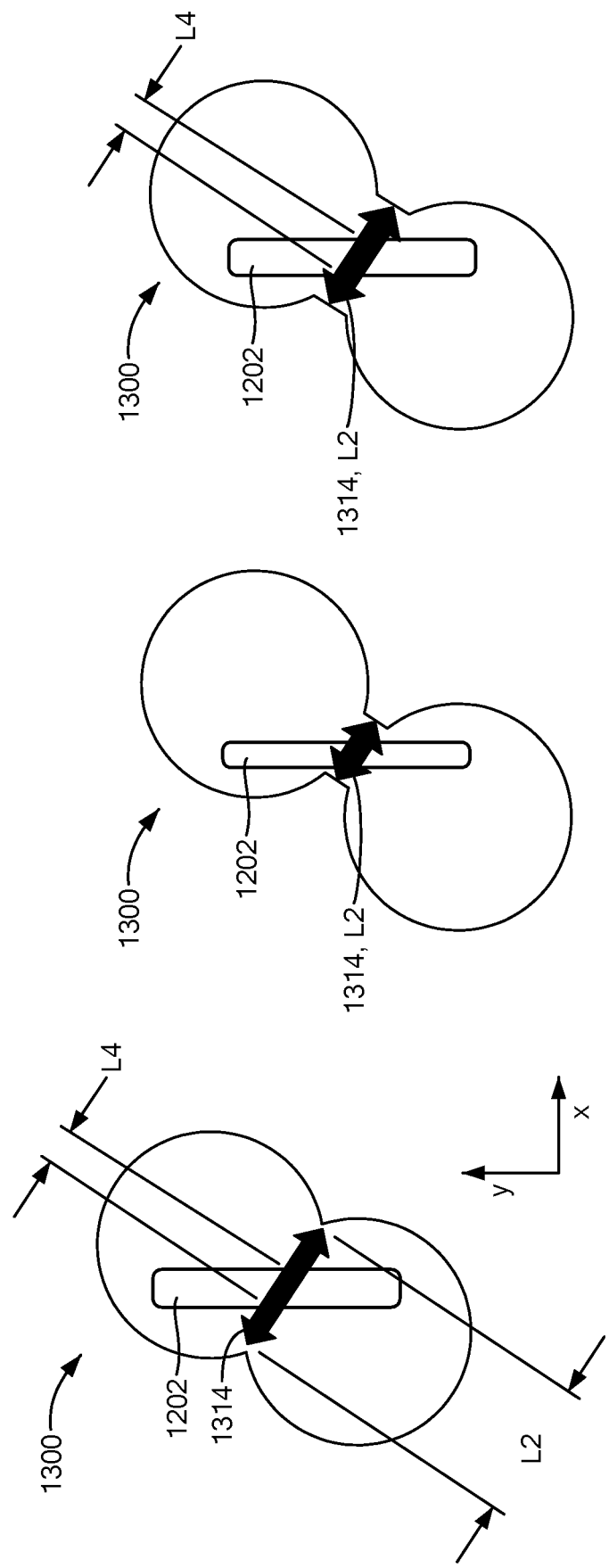

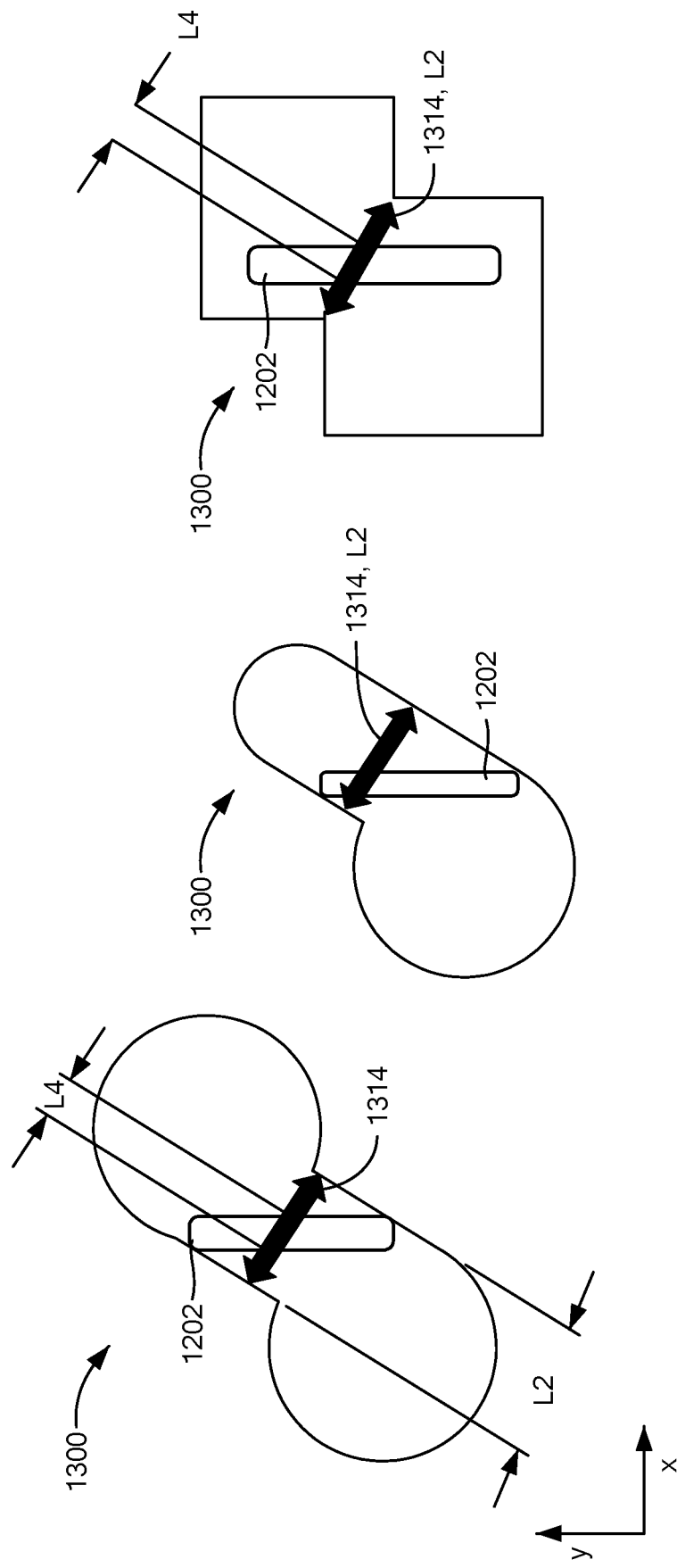

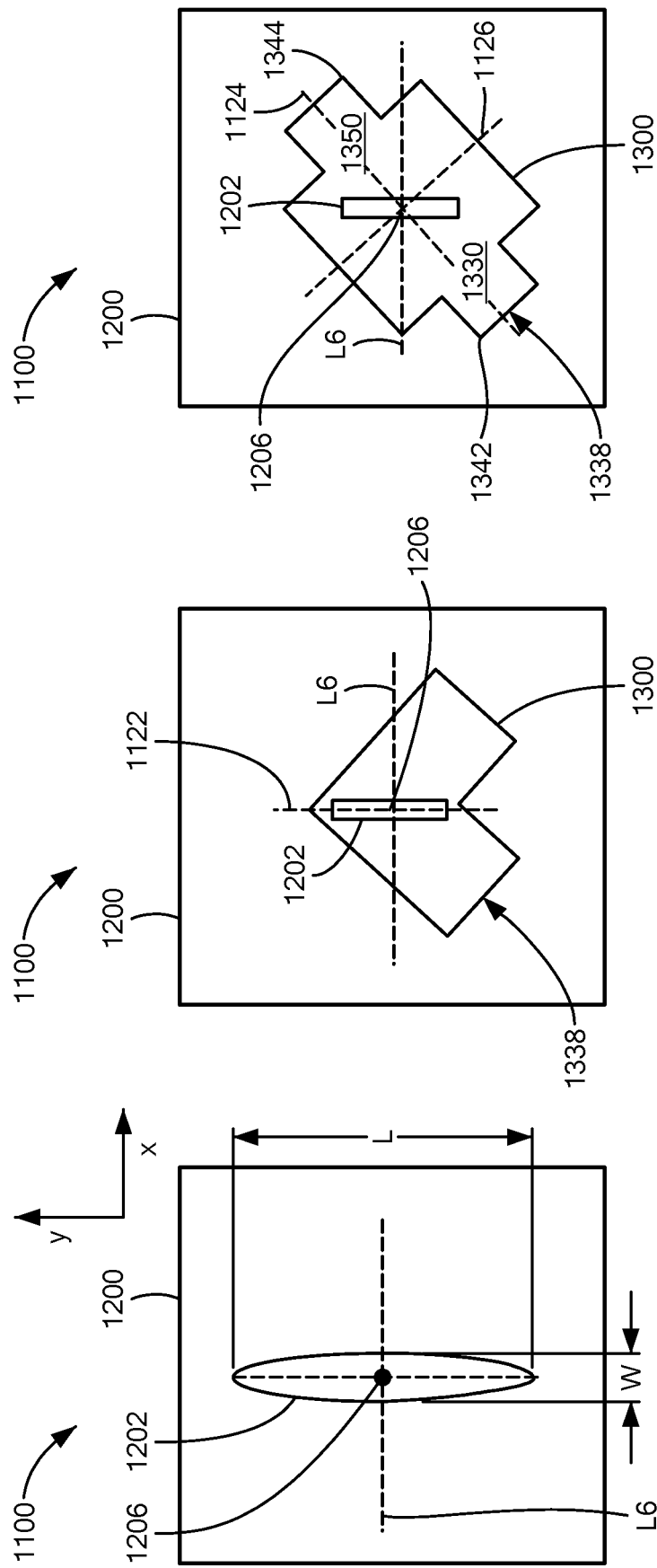

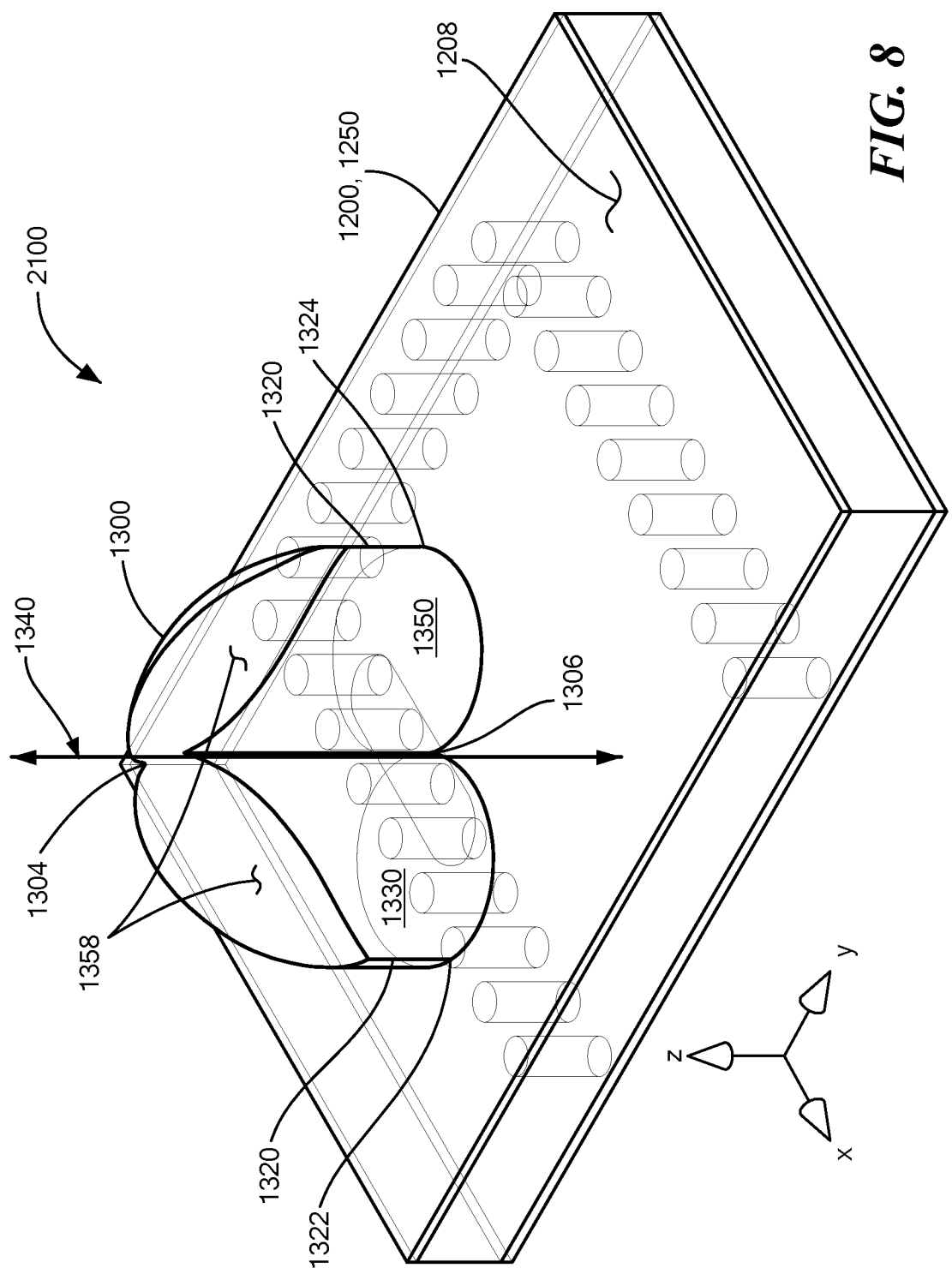

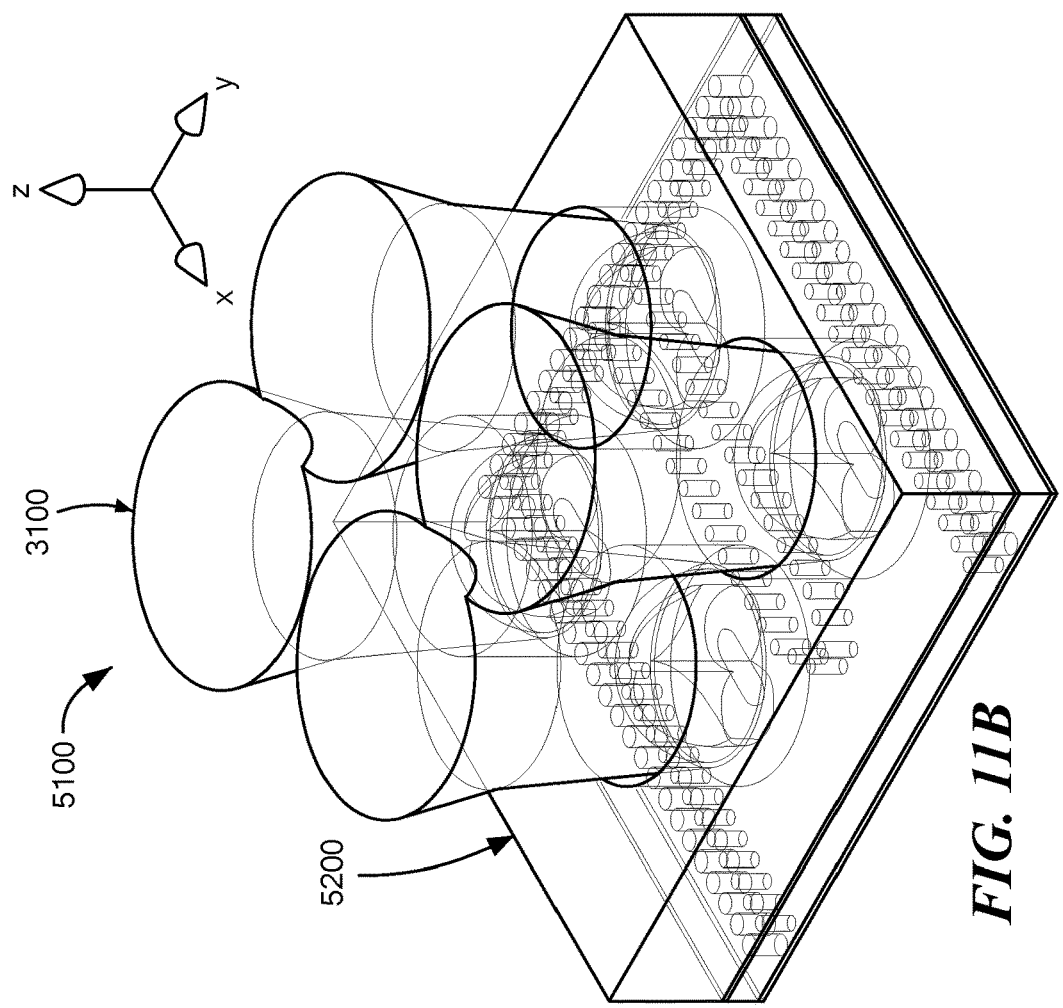
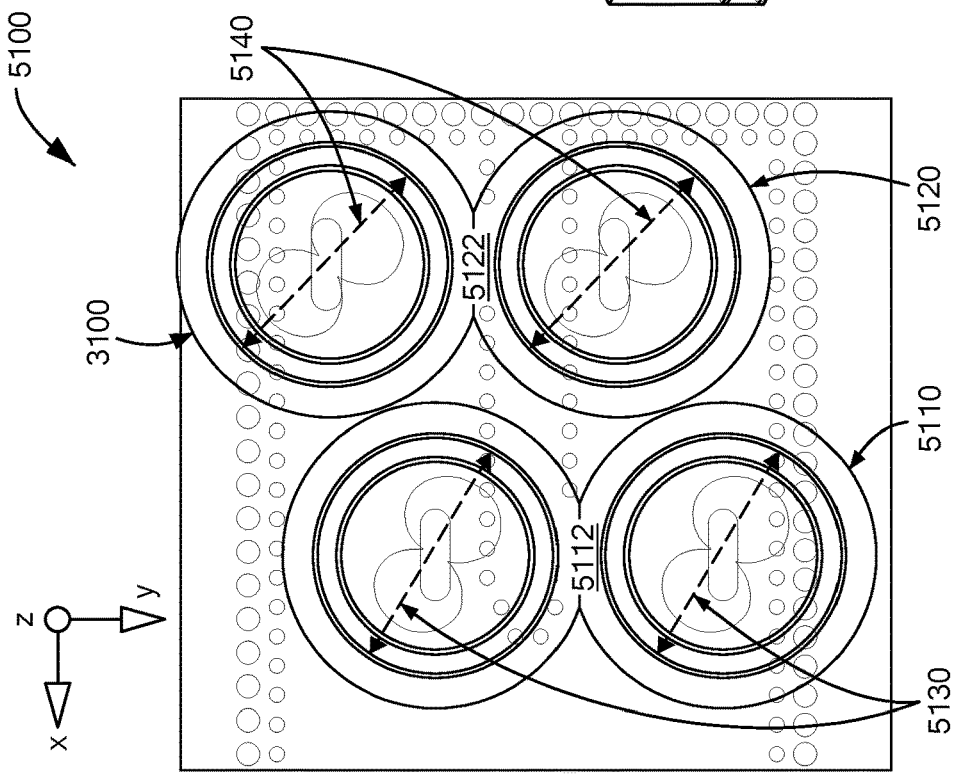
*FIG. 11B*
*FIG. 11A*

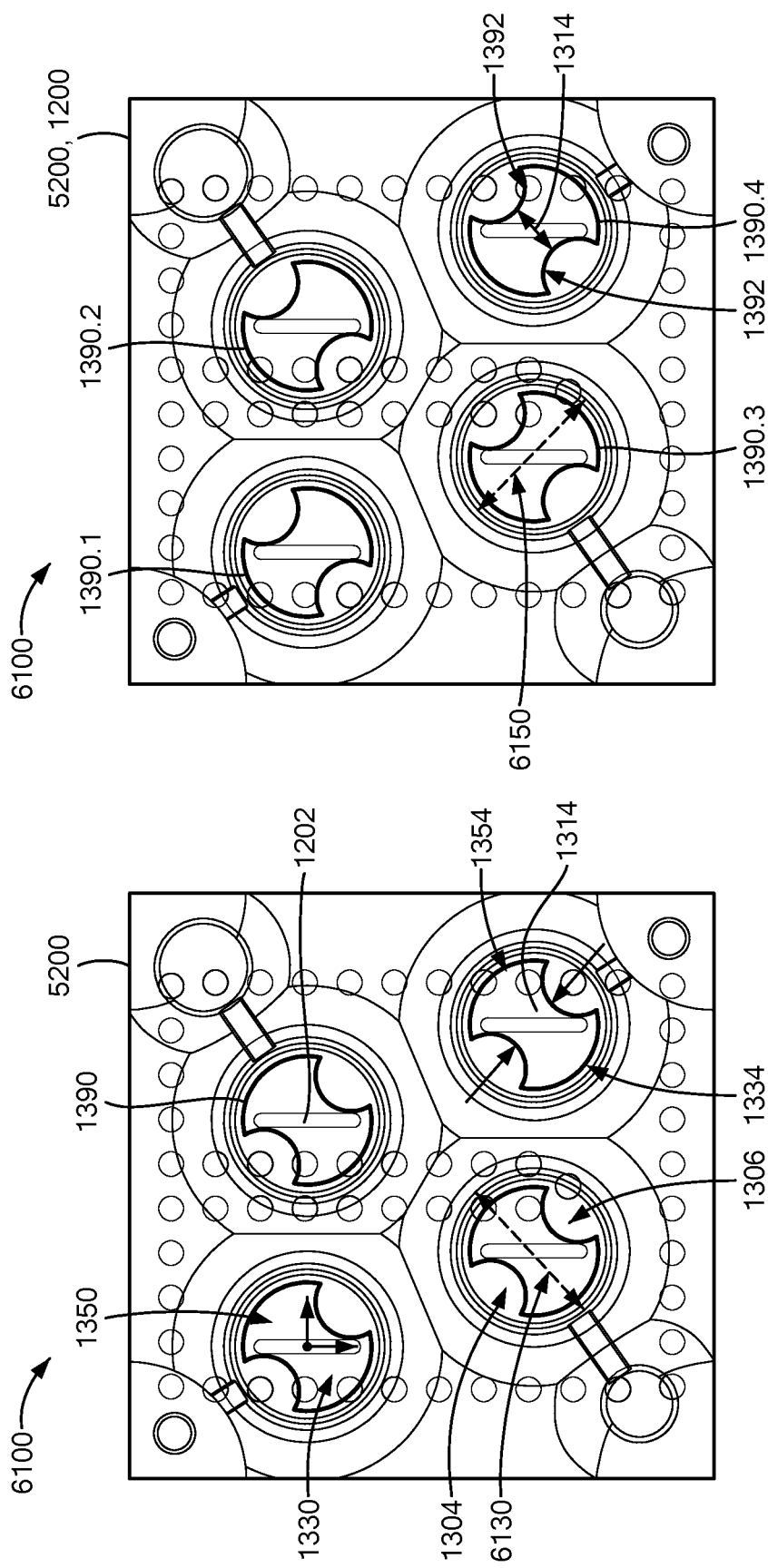

POLARIZED ELECTROMAGNETIC DEVICE

CROSS REFERENCE TO RELATED APPLICATIONS

This application claims the benefit of U.S. Provisional Application Ser. No. 62/968,174, filed Jan. 31, 2020, which is incorporated herein by reference in its entirety.

BACKGROUND

The present disclosure relates generally to an electromagnetic, EM, device, particularly to a resonator antenna, more particularly to a dielectric resonator antenna, DRA, and further particularly to a dielectric resonator antenna configured to produce elliptical or circular polarized far field electromagnetic radiation.

Example DRAs are described in co-assigned U.S. Pat. Nos. 10,355,361; 10,374,315; and, 10,476,164.

While existing DRAs may be suitable for their intended purpose, the art relating to DRAs would be advanced with a DRA configuration productive of elliptical or circular polarized far field electromagnetic radiation.

BRIEF SUMMARY

In an embodiment, an electromagnetic device includes: a substrate having an elongated aperture having an overall length, L, and an overall width, W, as observed in a plan view of the device, where L>W; a dielectric medium having a dielectric material other than air disposed on the substrate substantially covering the aperture, the dielectric medium having a cross sectional boundary as viewed in the plan view of the device, the cross sectional boundary having at least one recessed portion that recesses inward toward the aperture from a tangent line that partially bounds the cross sectional boundary; wherein the length L is not perpendicular to the tangent line.

In an embodiment, an electromagnetic device includes: a substrate having an elongated aperture having an overall length, L, and an overall width, W, as observed in a plan view of the device, where L>W; a dielectric medium having a dielectric material other than air disposed on the substrate substantially covering the aperture, the dielectric medium having a cross sectional boundary, as viewed in the plan view of the device, that is symmetrical with respect to an in-plane axis of reflection of the dielectric medium; wherein the device is configured such that a line perpendicular to the overall length L of the elongated aperture and passing through a center point of the elongated aperture is not any in-plane axis of reflection.

In an embodiment, an apparatus includes: a substrate having multiple adjacent electromagnetic signal channels, each channel having one or more dielectric resonator antennas, DRAs, with an associated electromagnetic feed structure configured to have a direction of propagation, $\overline{Y}$, of an electromagnetic field toward the one or more DRAs; each DRA of the one or more DRAs having a dielectric structure configured to: produce in response to an electromagnetic signal on a corresponding electromagnetic feed structure at least one of; circularly polarized electromagnetic radiation, and elliptically polarized electromagnetic radiation; or, produce an electromagnetic signal on a corresponding electromagnetic feed structure in response to an impinging at least one of; circularly polarized electromagnetic radiation, and elliptically polarized electromagnetic radiation.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered alike in the accompanying Figures:

FIGS. 1C, 1D, 1E, 1F, 1G, and 1H, depict top and cross section views of various signal feed arrangements suitable for use with one or more of the EM devices disclosed herein, in accordance with an embodiment FIGS. 2A, 2B, 2C, 2D, 2E, and 2F, depict in plan view example profiles of dielectric medium, in accordance with an embodiment;

FIGS. 3A, 3B, 3C, 3D, 3E, and 3F, depict in plan view example profiles of the dielectric medium of FIGS. 2A-2F with an elongated aperture, in accordance with an embodiment;

FIGS. 5A, 5B, 5C, and 5D, depict in plan view other example EM devices, in accordance with an embodiment;

FIG. 8 depicts in transparent rotated isometric view an example EM device, in accordance with an embodiment;

FIG. 11A depicts in transparent plan view an example array of EM devices, in accordance with an embodiment;

FIG. 11B depicts in transparent rotated isometric view the example array of EM devices of FIG. 11A, in accordance with an embodiment;

FIGS. 13A, 13B, and 13C, depict in transparent plan view example arrays of EM devices, in accordance with an embodiment;

DETAILED DESCRIPTION

Although the following detailed description contains many specifics for the purposes of illustration, anyone of ordinary skill in the art will appreciate that many variations and alterations to the following details are within the scope of the appended claims. Accordingly, the following example embodiments are set forth without any loss of generality to, and without imposing limitations upon, the claimed invention disclosed herein.

An embodiment, as shown and described by the various figures and accompanying text, provides an EM device and an array of EM devices having a DRA disposed on a substrate having an electromagnetic signal feed that includes an elongated aperture, wherein the DRA is so structured and configured with respect to the elongated aperture such that the DRA is productive of elliptical or circular polarized far field electromagnetic radiation.

Figure 1A:
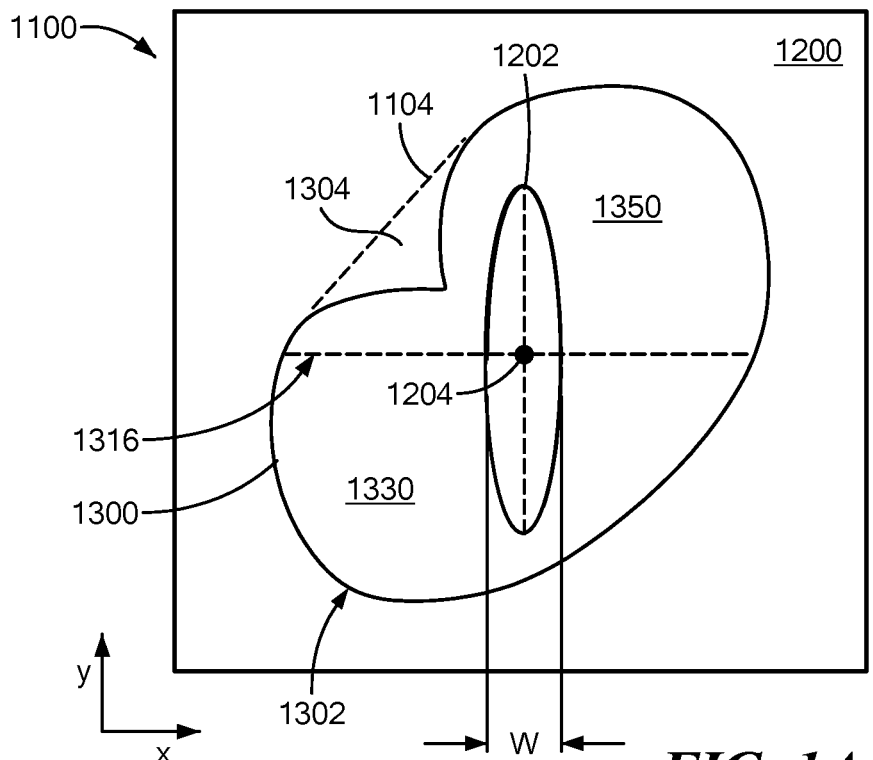
FIGS. 1A and 1B depict in plan view an example EM device, in accordance with an embodiment.
Figure 1B:
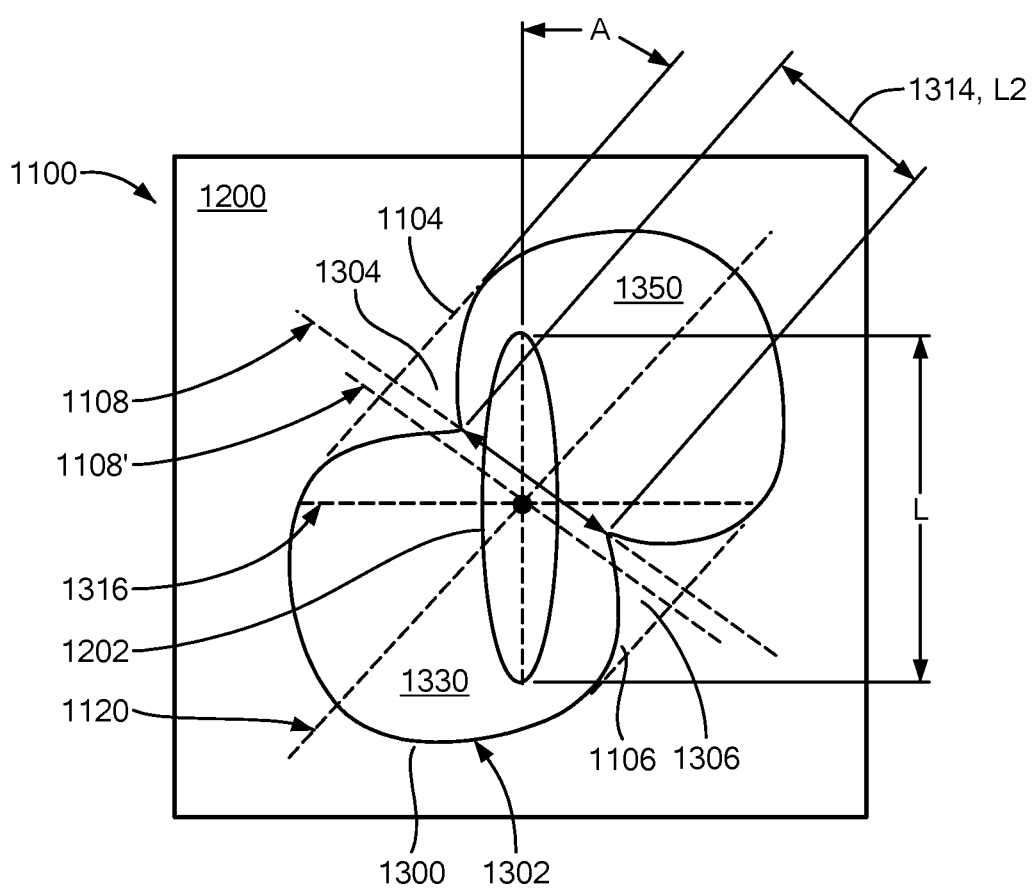

Reference is now made to FIGS. 1A and 1B, which depict alternative x-y cross section plan views of an EM device 1100. In an embodiment the EM device 1100 includes a substrate 1200 that includes an elongated aperture 1202 having an overall length, L, and an overall width, W, as observed in the plan view of the EM device 1100, where L>W; a dielectric, Dk, medium 1300 having a Dk material other than air disposed on the substrate 1200 substantially covering the elongated aperture 1202, the Dk medium having a cross sectional boundary 1302 as viewed in the plan view of the EM device 1100, the cross sectional boundary 1302 having at least one recessed portion 1304, 1306 that recesses inward toward the aperture 1202 away from a corresponding tangent line 1104, 1106 that partially bounds the cross sectional boundary 1302; wherein the length L (alternatively interpreted as a direction of the length L) is not perpendicular to the tangent line 1104, 1106. In an embodiment, the length L is not parallel to the tangent line 1104. In an embodiment, the length L is oriented at an angle, A, relative to the tangent line 1104, where A is equal to or greater than 10 degrees and equal to or less than 80 degrees.

As used herein, the phrase "substantially covering" is intended to encompass minor deviations from 100% (i.e., complete) covering that do not negatively impact the electromagnetic performance of the corresponding EM device for a purpose disclosed herein.

As used herein, the phrase "having a Dk material other than air" necessarily includes a Dk material that is not air, but may also include air, which in an embodiment may include a foam. As used herein, the phrase "comprising air" necessarily includes air, but also does not preclude a Dk material that is not air, which in an embodiment may include a foam. Also, the term "air" may more generally be referred to and viewed as being a gas having a Dk constant that is suitable for a purpose disclosed herein, and in an embodiment may be air.

While the Dk medium 1300 is depicted having a two-dimensional, 2D, cross sectional boundary 1302, it will be appreciated that the Dk medium 1300 as a whole is a three-dimensional, 3D, structure that extends outward along the z-axis, which will be evident from a reading of the entire disclosure as provided herein. In an embodiment, the Dk medium 1300 forms at least a portion of a DRA. In an embodiment, the cross-sectional boundary 1302 of the Dk medium 1300 is a cross-sectional outer boundary of the Dk medium 1300.

In an embodiment, the elongated aperture 1202 may be formed by a coplanar waveguide (CPWG) signal feed, a substrate integrated waveguide (SIW), a stripline, a microstrip, or any other signal feed suitable for a purpose disclosed herein. For example, in an embodiment: the elongated aperture 1202 is an opening in an electrically conductive layer of the substrate 1200; the elongated aperture 1202 is an aperture in a substrate integrated waveguide, SIW, (depicted generally by reference numeral 1200), as illustrated in FIG. 1C, FIG. 8, 9A-C, 11A-B, 13A-B, 14A-B, and FIG. 15, (discussed further herein below); the elongated aperture 1202 is an aperture over a microstrip, as illustrated in FIG. 1D (discussed further herein below) or stripline, as illustrated in FIG. 1E (discussed further herein below); the elongated aperture 1202 includes at least two separate openings 1202.1, 1202.2, collectively referred to as a bifurcated elongated aperture 1202', in an electrically conductive layer of the substrate 1200, as illustrated in FIG. 1F (discussed further herein below); the elongated aperture 1202 is formed by at least a portion of a coplanar waveguide, as illustrated in FIGS. 1G and 1H (discussed further herein below). In an embodiment where the substrate 1200 includes other structure discussed herein below (such as an electrically conductive EM reflector 1270 for example discussed herein below), that portion of the substrate 1200 that the provides the signal feed is more particularly herein referred to as a signal feed substrate 1250.

Reference is now made to FIGS. 1C, 1D, 1E, 1F, 1G, and 1H, where each figure depicts a top view and a corresponding cross section view through section cut A-A of the corresponding top view.

FIG. 1C depicts the substrate 1200 forming a signal feed in the form of a SIW 1200.1, where the substrate 1200 includes a dielectric medium 1220 with lower and upper electrically conductive layers 1221, 1222, adhered or laminated to the dielectric medium 1220, that are electrically connected to each other by way of electrically conductive vias 1224. The upper electrically conductive layer 1222 has an elongated aperture 1202 disposed and configured as described herein. Dk medium 1300, configured as disclosed herein, is disposed on the upper electrically conductive layer 1222 over the elongated aperture 1202. In an embodiment, the Dk medium 1300 completely covers the elongated aperture 1202.

FIG. 1D depicts the substrate 1200 forming a signal feed in the form of a microstrip 1200.2, where the substrate 1200 includes a dielectric medium 1220 with an upper electrically conductive layer 1222 adhered or laminated to the dielectric medium 1220, and an electrically conductive signal line 1230, adhered or laminated to the dielectric medium 1220, disposed opposing the upper electrically conductive layer 1222 on an opposing side of the dielectric medium 1220. The upper electrically conductive layer 1222 has an elongated aperture 1202 disposed and configured as described herein. The signal line 1230 is centrally disposed perpendicular to a lengthwise direction of the elongated aperture 1202, and extends below, traverses, and is in signal communication with, the elongated aperture 1202. Dk medium 1300, configured as disclosed herein, is disposed on the upper electrically conductive layer 1222 over the elongated aperture 1202. In an embodiment, the Dk medium 1300 completely covers the elongated aperture 1202.

FIG. 1E depicts the substrate 1200 forming a signal feed in the form of a stripline 1200.3, where the substrate 1200 includes a dielectric medium 1220 with lower and upper electrically conductive layers 1221, 1222, adhered or laminated to the dielectric medium 1220, and an electrically conductive signal line 1230 embedded within the dielectric medium 1220 between the lower and upper electrically conductive layers 1221, 1222. The upper electrically conductive layer 1222 has an elongated aperture 1202 disposed and configured as described herein. The signal line 1230 is centrally disposed perpendicular to a lengthwise direction of the elongated aperture 1202, and extends below, traverses, and is in signal communication with, the elongated aperture 1202. Dk medium 1300, configured as disclosed herein, is disposed on the upper electrically conductive layer 1222 over the elongated aperture 1202. In an embodiment, the Dk medium 1300 completely covers the elongated aperture 1202.

FIG. 1F depicts a modified version of FIG. 1D, with the substrate 1200 forming a signal feed in the form of a stripline 1200.4 where the elongated aperture 1202 (see FIG. 1D) is a bifurcated elongated aperture 1202' (as depicted in FIG. 1F) having at least two separate openings 1202.1, 1202.2 in lengthwise linear alignment with each other. The substrate 1200 includes a dielectric medium 1220 with an upper electrically conductive layer 1222 adhered or laminated to the dielectric medium 1220, and an electrically conductive signal line 1230, adhered or laminated to the dielectric medium 1220, disposed opposing the upper electrically conductive layer 1222 on an opposing side of the dielectric medium 1220 (best seen with reference to FIG. 1D). The upper electrically conductive layer 1222 has the bifurcated elongated aperture 1202' disposed and configured similar to that of the elongated aperture 1202 as described herein (i.e., overall lengthwise arrangement with respect to the Dk medium 1300). The signal line 1230 is centrally disposed perpendicular to an overall lengthwise direction of the bifurcated elongated aperture 1202', and extends below, traverses, and is in signal communication with, the bifurcated elongated aperture 1202'. The Dk medium 1300, configured as disclosed herein, is disposed on the upper electrically conductive layer 1222 over the bifurcated elongated aperture 1202'. In an embodiment, the Dk medium 1300 completely covers the bifurcated elongated aperture 1202'.

FIG. 1G depicts the substrate 1200 forming a signal feed in the form of a coplanar waveguide (CPWG) 1200.5, where the substrate 1200 includes a dielectric medium 1220 with lower and upper electrically conductive layers 1221, 1222, adhered to or laminated to the dielectric medium 1220, that are electrically connected to each other by way of electrically conductive vias 1224 (see also FIG. 1C for example). The lower electrically conductive layer 1221 forms an electrically conductive ground of the CPWG 1200.5. The upper electrically conductive layer 1222 includes an electrically conductive signal line 1230 of the CPWG 1200.5. The upper electrically conductive layer 1222 also includes a bifurcated elongated aperture 1202' having at least two separate openings 1202.1, 1202.2 in lengthwise linear alignment with each other, similar to that of FIG. 1F, but where the openings 1202.1, 1202.2 in the upper electrically conductive layer 1222 are integrally formed with side channels 1231, 1232 that are disposed parallel to and form the signal line 1230. The signal line 1230 is centrally disposed perpendicular to an overall lengthwise direction of the bifurcated elongated aperture 1202', and extends coplanar with, traverses, and is in signal communication with, the bifurcated elongated aperture 1202'. Dk medium 1300, configured as disclosed herein, is disposed on the upper electrically conductive layer 1222 over the bifurcated elongated aperture 1202'. In an embodiment, the Dk medium 1300 completely covers the bifurcated elongated aperture 1202'.

FIG. 1H depicts the substrate 1200 forming a signal feed in another form of a CPWG 1200.6, similar to that of FIG. 1G but where the elongated aperture 1202 is not bifurcated. Similar to FIG. 1G, the substrate 1200 includes a dielectric medium 1220 with lower and upper electrically conductive layers 1221, 1222, adhered to or laminated to the dielectric medium 1220, that are electrically connected to each other by way of electrically conductive vias 1224 (see also FIG. 1C for example). The lower electrically conductive layer 1221 forms an electrically conductive ground of the CPWG 1200.6. The upper electrically conductive layer 1222 includes an electrically conductive signal line 1230 of the CPWG 1200.6. The upper electrically conductive layer 1222 also includes an elongated aperture 1202, similar to that of FIGS. 1C-1E, but where the elongated aperture 1202 in the upper electrically conductive layer 1222 is integrally formed with side channels 1231, 1232 that are disposed parallel to and form the signal line 1230. The signal line 1230 is centrally disposed perpendicular to an overall lengthwise direction of the elongated aperture 1202, and extends coplanar with, and is in signal communication with, the elongated aperture 1202. Dk medium 1300, configured as disclosed herein, is disposed on the upper electrically conductive layer 1222 over the elongated aperture 1202. In an embodiment, the Dk medium 1300 completely covers the elongated aperture 1202.

In an embodiment, the at least one recessed portion 1304, 1306 defines locations of a first portion 1330 of the dielectric medium 1300 on one side of the at least one recessed portion 1304, 1306 and a second portion 1350 of the dielectric medium 1300 on an opposing side of the at least one recessed portion 1304, 1306. In an embodiment, the first and second portions 1330, 1350 may be distinctly defined with respect to each other by a vertical demarcation plane that centrally bifurcates the Dk medium 1300 and is parallel with the z-axis, which will be described further herein below. As depicted in FIGS. 1A and 1B, the corresponding tangent lines 1104, 1106 extend tangentially between the first and second portions 1330, 1350.

In an embodiment, the at least one recessed portion 1304, 1306 includes a Dk material having a first Dk constant; the first portion 1330 of the Dk medium 1300 includes a Dk material having a second Dk constant; the second portion 1350 of the Dk medium 1300 includes a Dk material having a third Dk constant; and, the first Dk constant is less than the second Dk constant and less than the third Dk constant. In an embodiment, the second Dk constant of the first portion 1330 is substantially equal to the third Dk constant of the second portion 1350. In an embodiment and as depicted in FIG. 1B, the at least one recessed portion 1304, 1306 includes two recessed portions 1304 and 1306. In an embodiment, the two recessed portions 1304, 1306 oppose each other on opposing sides of the elongated aperture 1202 to form a neck 1314, or alternatively herein referred to as a necked down region, in the Dk medium 1300, the neck 1314 having an overall necked-down dimension L2 relative to the outer dimensions of the first and second portions 1330, 1350. In an embodiment, the two opposing recessed portions 1304, 1306 are substantially mirror images of each other relative to a plane of symmetry 1120 that is parallel to the z-axis, and is equidistance from the two tangent lines 1104, 1106. In an embodiment, the first and second portions 1330, 1350 are substantially mirror images of each other relative to a plane of symmetry 1108 that is parallel to the z-axis, and passes through the necked-down dimension L2 of the neck 1314. In an embodiment, the plane of symmetry 1108 passes through the geometrical center 1204 of the elongated aperture 1202, as represented by dashed line 1108' in FIG. 1B. As used herein, the phrase "substantially equal to" is intended to accommodate manufacturing or fabrication tolerances, such that the phrase "substantially equal to" means "equal to" if said tolerances are zero.

Throughout the written description provided herein various mentions are made of one Dk constant in comparison to another Dk constant, where one may be higher or lower or equal to the other. As used herein, the ranges of Dk constants are intended to be suitable for a purpose disclosed herein, where a relatively higher Dk constant is on the order of equal to or greater than 9, such as 9 to 15 for example, and where a relatively lower Dk constant is on the order of less than 9, such as 3 to 8 for example. In view of the foregoing, it will be appreciated that other ranges of Dk constants not specifically noted herein are nonetheless contemplated and considered to be disclosed herein inherently. For example, a relatively lower Dk constant of a dielectric medium comprising a dielectric material other than air that may include a foam, may have a Dk constant that is greater than that of air but close to 1. As such, any range of Dk constants that falls within the ranges disclosed herein for a purpose disclosed herein is contemplated.

In an embodiment and as observed in the plan view of the EM device 1100, a straight line path 1316 through the dielectric medium 1300, in a direction parallel to the width W, and through the center point (geometrical center) 1204 of the elongated aperture 1202, extends through both the first and second portions 1330, 1350 of the dielectric medium 1300, and does not extend through either of the at least one recessed portion 1304, 1306, as observed particularly with reference to FIG. 1B.

Reference is now made to FIGS. 2A-2F in combination with FIGS. 1A-1B, where each figure depicts an alternative arrangement of first and second portions 1330, 1350, of the Dk medium 1300, which will now be described individually.

In general: FIG. 2A depicts a Dk medium 1300 having two portions 1330, 1350 each with convex (outwardly curved) outer boundaries that are joined at the neck 1314; FIG. 2B depicts a Dk medium 1300 having two portions 1330, 1350 similar to that of FIG. 2A, but with a concave (inwardly curved) outer boundary in the region where they are joined at the neck 1314; FIG. 2C depicts a Dk medium 1300 having two portions 1330, 1350 similar to that of FIG. 2A, but with a straight line outer boundaries on both sides in the region where they are joined at the neck 1314; FIG. 2D depicts a Dk medium 1300 having two portions 1330, 1350 similar to that of FIG. 2A, but with a straight line outer boundaries on both sides in the region where they are joined at the neck 1314, and where the straight line boundaries on each side of the neck 1314 tangentially transition into the outer boundaries of corresponding ones of the two portions 1330, 1350; FIG. 2E depicts a Dk medium 1300 having two portions 1330, 1350 similar to that of FIG. 2A, but with a straight line outer boundaries on both sides in the region where they are joined at the neck 1314, and where the straight line boundaries on each side of the neck 1314 tangentially transition into the outer boundary of the first portion 1330 on one side only, and tangentially transition into the outer boundary of the second portion 1350 on both sides; and, FIG. 2F depicts a Dk medium 1300 having two portions 1330, 1350 each with straight edge outer boundaries in the shape of rectangles or squares that are joined at the neck 1314.

In an embodiment and as observed in the plan view of the EM device 1100, the first portion 1330 has a first maximum overall outside dimension 1332, the second portion 1350 has a second maximum overall outside dimension 1352, wherein the first portion 1330 and the second portion 1350 define the neck 1314 therebetween, and the neck 1314 has a minimum overall outside dimension L2 (see representative FIGS. 1A and 2F for example) that is less than both the first and the second maximum overall outside dimensions 1332, 1352. In an embodiment, the minimum overall outside dimension L2 of the neck 1314 is in a direction that is neither perpendicular nor parallel to the length L of the aperture 1202 (see representative FIGS. 1B and 2F for example). As depicted in FIGS. 2A-2F, the first maximum overall outside dimension 1332, the second maximum overall outside dimension 1352, and the minimum overall outside dimension L2, are all in a direction parallel with each other.

In an embodiment and as observed in the plan view of the EM device 1100, at least one of the first portion 1330 and the second portion 1350 has an outwardly curved outer boundary 1334, 1354 (see representative FIGS. 2C and 2E for example). In an embodiment, and as observed in the plan view of the EM device 1100, at least one of the first portion 1330 and the second portion 1350 has at least one linear outer boundary 1336, 1356 (see representative FIGS. 2D and 2F for example). In an embodiment, at least one of the first portion 1330 and the second portion 1350 has a partially rectangular outer boundary 1336', 1356' (see representative FIG. 2F for example). In an embodiment, the first portion 1330, the second portion 1350, and the neck 1314, have a combined outer boundary 1334, 1354 that is symmetrical with respect to an in-plane axis of reflection 1120 (see representative FIG. 2A for example). As used herein, the phrase "in-plane axis of reflection" is synonymous with an in-plane axis of symmetry wherein objects (boundaries of 3D structures such as the Dk medium 1300) on one side of the axis of symmetry are a mirror image of corresponding objects on the opposing side of the axis of symmetry. In an embodiment, the in-plane axis of reflection 1120 is substantially orthogonal to the minimum overall outside dimension L2 of the neck 1314 (see FIGS. 1B and 2A). In an embodiment, the in-plane axis of reflection 1120 extends along the maximum overall length L3 of the Dk medium 1300 (see FIG. 2A). In an embodiment, the minimum overall outside dimension L2 of the neck 1314 has a line of traversal that traverses the elongated aperture 1202 along a traversal path L4 (see FIG. 2F, for example) that extends across and terminates at opposing sides of the elongated aperture 1202, the minimum overall outside dimension L2 of the neck 1314 being greater than a straight line length L4 of the traversal path (both the traversal path and corresponding straight line length are herein referred to with reference to L4). In an embodiment, the traversal path L4 extends across the elongated aperture 1202 in a direction that is neither perpendicular nor parallel to the direction of length L of the aperture 1202 (see FIG. 2F for example).

Figure 4:
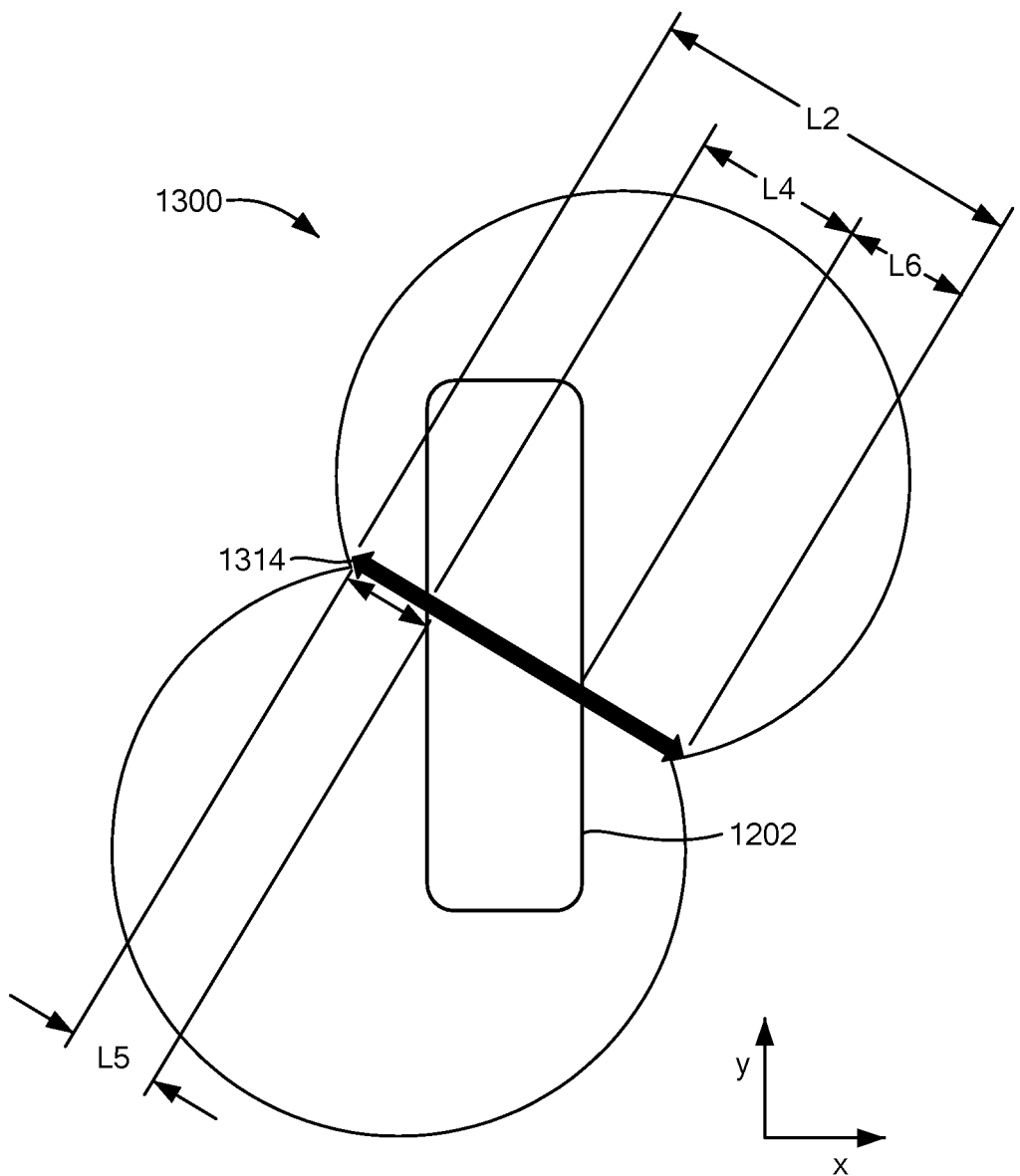
FIG. 4 depicts in plan view an enlarged illustration of FIG. 3A, in accordance with an embodiment.

Reference is now made to FIGS. 3A-3F, and FIG. 4, in combination with FIGS. 1A-1B, and FIGS. 2A-2F, where FIGS. 3A-3F depict similar structure as that depicted in FIGS. 2A-2F, respectively (in view of the similar structure depicted, like reference numerals from FIGS. 2A-2F are not repeated in FIGS. 3A-3F), but with an elongated aperture 1202, and the minimum overall outside dimension L2 of the neck 1314, depicted in each figure. FIG. 4 depicts an expanded view of FIG. 3A.

In an embodiment, the minimum overall outside dimension L2 of the neck 1314 is greater than the straight line length of the traversal path L4 that traverses the elongated aperture 1202, with a defined minimum L5, L6 of Dk material of the Dk medium 1300 disposed on both sides of the elongated aperture 1202. While dimensions L2, L4 are not duplicated in each of FIGS. 3A-3F for clarity of the illustrations, it will be appreciated by one skilled in the art that such dimensions L2, L4 are readily applicable to all FIGS. 3A-3F. FIG. 4 depicts an enlarged version of the embodiment of FIG. 3A to more particularly illustrate the defined minimum L5, L6 of Dk material of the Dk medium 1300 disposed on both sides of the elongated aperture 1202. While enlarged versions of the embodiments of FIGS. 3B-3F are not so similarly depicted as that in FIG. 4, it will be appreciated by one skilled in the art that such defined minimums L5, L6 of Dk material of the Dk medium 1300 disposed on both sides of the elongated aperture 1202 are equally applicable to the illustrated embodiments of FIGS. 3B-3F. In an embodiment, one or both of the defined minimum L5, L6 of Dk material of the Dk medium 1300 is equal to or less than ⅓ of the minimum overall outside dimension L2 of the neck 1314. In an embodiment, one or both of the defined minimum L5, L6 of Dk material of the Dk medium 1300 is equal to or less than ⅕ of the minimum overall outside dimension L2 of the neck 1314. In an embodiment, one or both of the defined minimum L5, L6 of Dk material of the Dk medium 1300 is equal to or less than ¹⁄₁₀ of the minimum overall outside dimension L2 of the neck 1314.

Reference is now made to FIGS. 5A, 5B, 5C, and 5D, in combination with all prior figures described herein above with respect to like reference numerals.

Figure 5D:
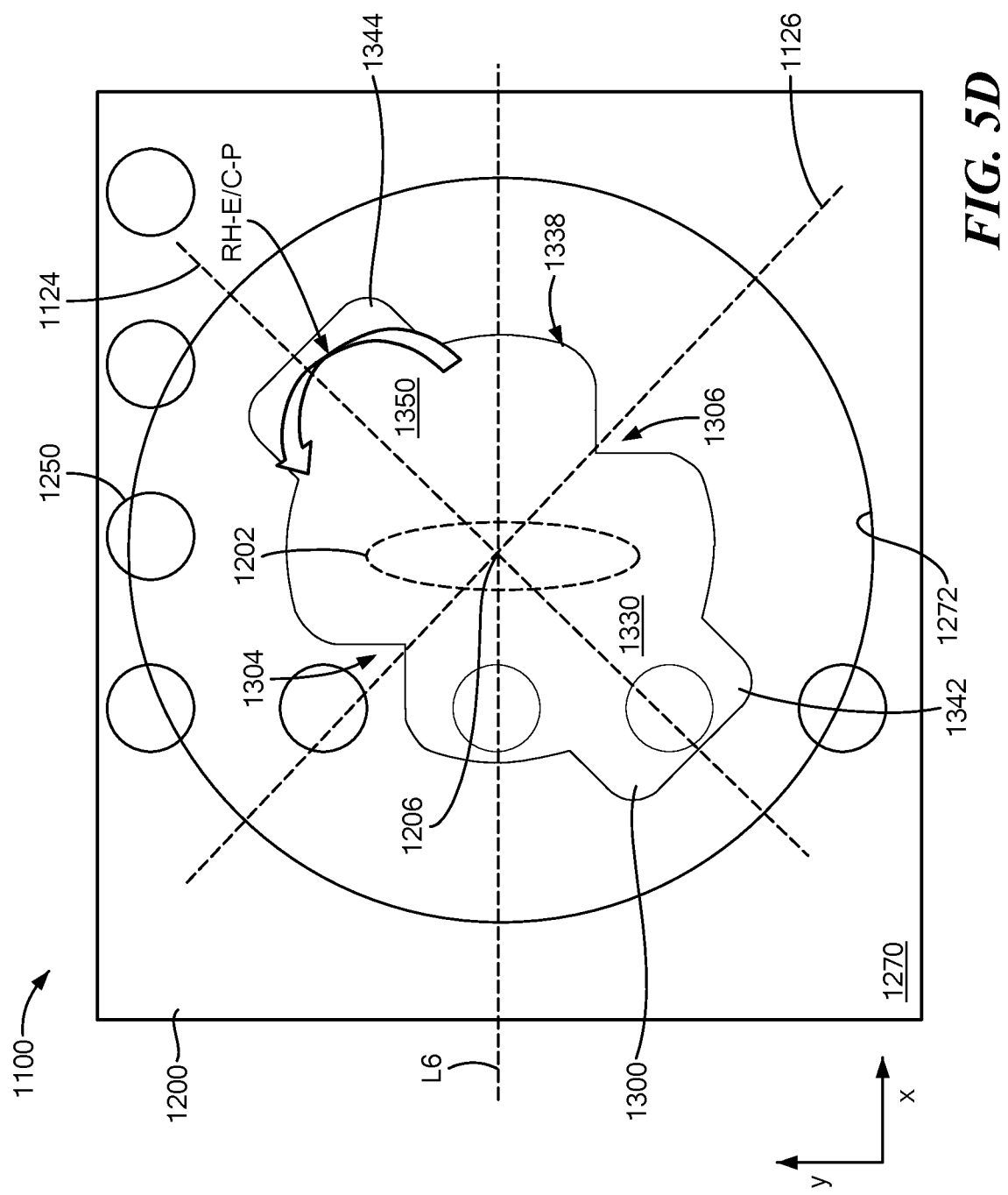

In an embodiment and with particular reference to FIG. 5A, an embodiment of the EM device 1100 includes the substrate 1200 having the elongated aperture 1202 with the overall length, L, and the overall width, W, as observed in the plan view of the EM device 1100, where L>W; the Dk medium 1300 having a dielectric material other than air disposed on the substrate 1200 substantially covering the aperture 1202, the Dk medium 1300 having a cross sectional boundary 1338 (see also 1334, 1354, 1336, 1356, described herein above), as viewed in the plan view of the EM device 1100, that is symmetrical with respect to at least one in-plane axis of reflection 1122 (FIG. 5B), or respectively a first and a second in-plane axis of reflection 1124, 1126 (FIGS. 5C and 5D), of the Dk medium 1300; wherein the EM device 1100 is configured such that a line L6 perpendicular to a direction of the overall length L of the elongated aperture 1202 and passing through a center point 1206 of the elongated aperture 1202 is not any in-plane axis of reflection 1122, 1124, 1126. As used herein, the first in-plane axis of reflection 1124 passes through both portions 1330, 1350 of the Dk medium 1300, and the second in-plane axis of reflection 1126 passes through a demarcation line between the two portions 1330, 1350 of the Dk medium 1300. In an embodiment, the cross-sectional boundary 1338 is a cross-sectional outer boundary of the Dk medium 1300. In an embodiment, the Dk medium 1300 forms at least a portion of a DRA.

While embodiments disclosed herein depict certain in-plane axes of reflection 1120, 1122, 1124, 1126, it will be appreciated by one skilled in the art that other in-plane axes of reflection (alternatively axes of symmetry) are possible and therefore herein contemplated, and it will be further appreciated by one skilled in the art from the disclosure herein the that phrase "not in any in-plane axis of reflection" means that the line L6 that is perpendicular to the direction of the overall length L of the elongated aperture 1202 and passing through the center point 1206 of the elongated aperture 1202 is necessarily other than an in-plane axis of reflection.

Reference is now made particularly to FIG. 5D (in combination with at least FIGS. 1A, 1B and 5A-5C), which depicts an embodiment of an EM device 1100 as described herein above, but with additional features that will now be described. Similar to other embodiments of Dk medium 1300 disclosed herein, the Dk medium 1300 of FIG. 5D includes two portions 1330 and 1350 with at least one recessed portion 1304 and 1306 (herein two recessed portions), and similar to the Dk medium 1300 of FIG. 5C, the Dk medium 1300 of FIG. 5D includes first and second projections 1342, 1344 that extend off of respective ones of the first and second portions 1330, 1350 in a direction parallel with or in a direction along the first in-plane axis of reflection 1124. In an embodiment, the first portion 1330, the second portion 1350, the first projection 1342, and the second projection 1344, of the dielectric medium 1300, are all integrally formed as a monolithic construct absent any fabrication seams between adjacent portions or projections. A point of distinction between FIG. 5D and FIG. 1B is the presence of both the first and second recessed portions 1304, 1306, and the presence of both the first and second projections 1342, 1344 in FIG. 5D. Similarly, a point of distinction between FIG. 5D and FIG. 5C is the presence of both the first and second recessed portions 1304, 1306, and the presence of both the first and second projections 1342, 1344 in FIG. 5D. In an embodiment, the first and second projections 1342, 1344 provide additional dielectric loading that serves to electromagnetically tune the axial ratio of the Dk medium 1300 to establish a desired electromagnetic elliptical/circular polarization, which in this instance is a right-hand elliptical/circular polarization (RH-E/C-P) as discussed herein below. To establish a desired axial ratio of dielectric loading of the Dk medium 1300, an embodiment includes a Dk loading arrangement where $Dk(r)$ equals $Dk(-r)$, where $r(0)$ is at the center point 1206 of the elongated aperture 1202, and the variables "r" and "-r" refer to diametrically opposing radii with respect to $r(0)$. As used herein, the condition of $Dk(r)$ equals $Dk(-r)$ is herein referred to as inversion symmetry. In an embodiment, the condition of inversion symmetry applies where the Dk loading of the Dk medium 1300 is uniform, or where the Dk loading of the Dk medium 1300 is non-uniform. While FIG. 5D depicts a particular structure for the Dk medium 1300 having a desired inversion symmetry, it will be appreciated that other shapes with inversion symmetry consistent with an invention disclosed herein are possible, and as such all such shapes of a Dk medium 1300 having an inversion symmetry consistent with the disclosure herein are contemplated. In an embodiment, the Dk medium 1300 of FIG. 5D has the 3D construct in the form of an extrusion along the vertical z-axis (origin of x-y-z axes located at the center point 1206).

In an embodiment, the substrate 1200 includes a signal feed substrate 1250 in the form of a SIW (see also FIGS. 9A, 9B and 9C) with an electrically conductive EM reflector 1270 disposed in electrical contact with an electrically conductive top layer 1222 (best seen with reference to FIGS. 1C-1H) of the signal feed substrate 1250. In an embodiment, the electrically conductive EM reflector 1270 includes a reflective wall 1272 that substantially surrounds the dielectric medium 1300. In an embodiment, a single dielectric medium 1300 is in a one-to-one correspondence with a single electrically conductive EM reflector 1270.

Figure 6A:
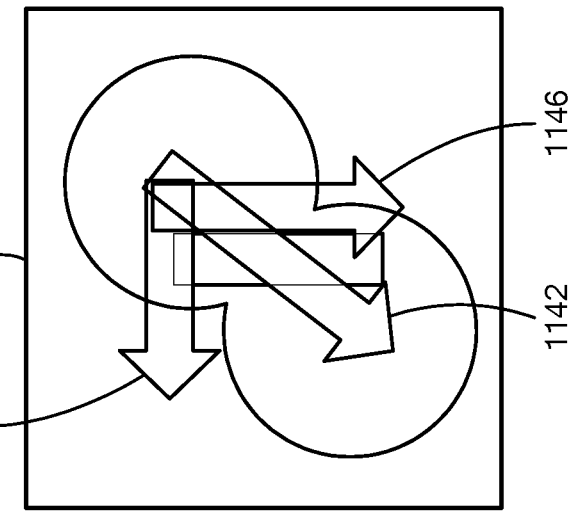
FIGS. 6A, 6B, and 6C, depict in plan view artistic renditions of electric field vectors associated with the example EM device of FIG. 3A, in accordance with an embodiment.
Figure 6B:
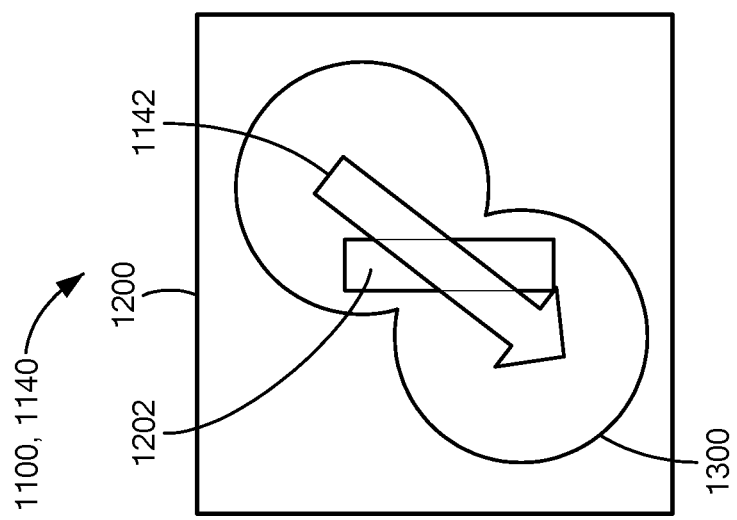
Figure 6C:
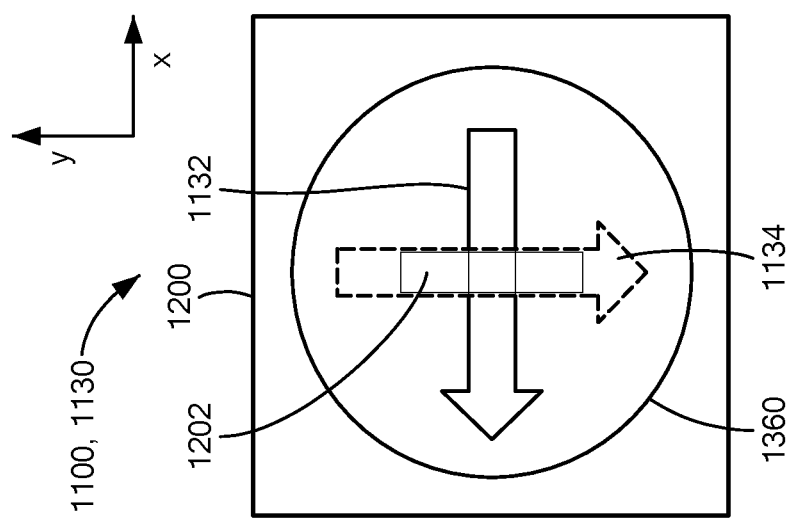

Reference is now made to FIGS. 6A, 6B, and 6C, in view of all of the foregoing descriptions associated with FIGS. 1A-5C.

FIG. 6A depicts a representation of a footprint of a full resonator 1130 of an EM device 1100 with a substrate 1200 having an elongated aperture 1202 disposed therein, and a Dk medium 1360 disposed on top of the substrate 1200 substantially covering the aperture 1202. In the example embodiment depicted in FIG. 6A, the Dk medium 1360 is a dome-shaped 3D structure having a circular cross-section in the x-y plane. The full resonator 1130 is depicted having a main path 1132 for an electric field that is defined by an electromagnetically excited mode of the EM device 1100, and a potential secondary path 1134 for an electric field that is defined by a non-electromagnetically excited mode of the EM device 1100. As depicted, the main path 1132 for the electric field is orthogonal to the elongated aperture 1202, and the secondary path 1134 is orthogonal to the main path 1132. FIG. 6B depicts a representation of a footprint of a modified resonator 1140 of an EM device 1100, in accordance with an embodiment disclosed herein (see FIG. 1B for example), with a substrate 1200 having an elongated aperture 1202 disposed therein, and a Dk medium 1300 (see 1300 in FIG. 1B for example) disposed on top of the substrate 1200 substantially covering the aperture 1202. As depicted, the modified resonator 1140 has a main path 1142 for an electric field defined by an electromagnetically excited mode of the EM device 1100 that is neither parallel to or orthogonal to the length direction L of the elongated aperture 1202 (the length direction L is depicted in FIGS. 1B, 2F, 5A, for example). And, FIG. 6C depicts a representation of the footprint of FIG. 6B with the main path 1142 of the associated electric field decomposed into respective horizontal and vertical field components Eh 1144, Ev 1146. In comparing the structures of the Dk medium 1360 of FIG. 6A and its associated main electric field path 1132, with the Dk medium 1300 of FIGS. 6B and 6C and its associated main electric field path 1142, it will be appreciated that the different Dk distributions of the Dk medium 1300 along the two directions of the Eh 1144 and Ev 1146 components is effective in creating different propagation phase delays that results in elliptical or circular polarization of the emitted electromagnetic radiation that radiates from the Dk medium 1300, as compared to that of the emitted electromagnetic radiation that radiates from the Dk medium 1360 having a uniform Dk distribution of the Dk medium 1360 in the x and y directions.

Figure 7A:
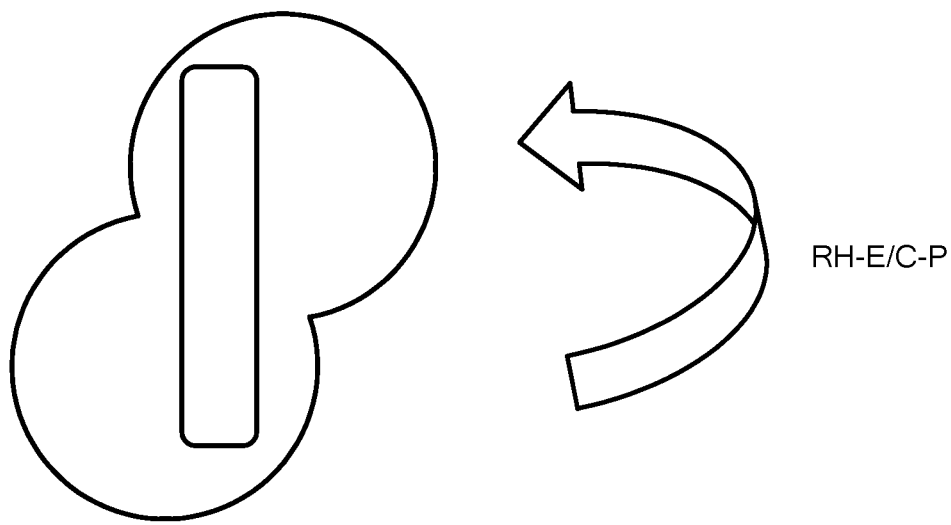
FIGS. 7A and 7B depict in plan view artistic renditions of electric field vectors, in accordance with an embodiment.
Figure 7B:
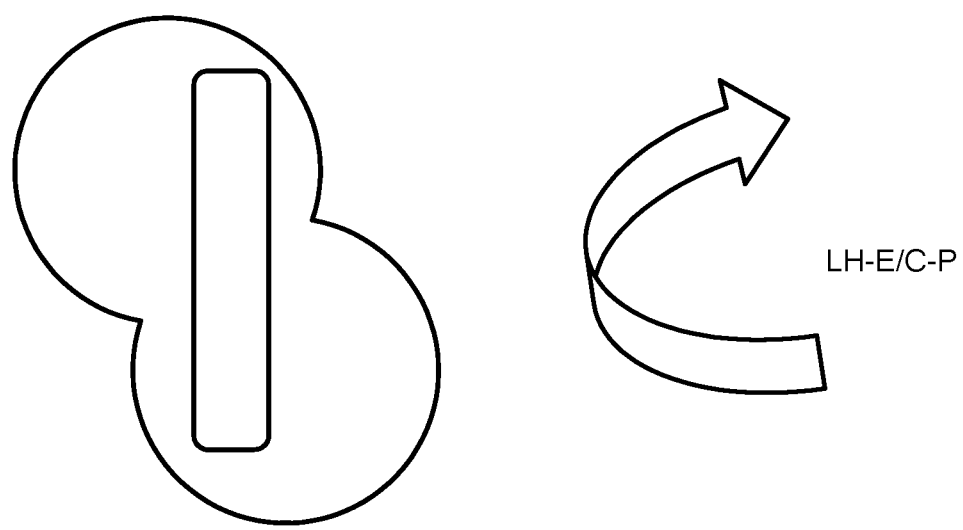

In the full resonator version (full dome) 1130 depicted in FIG. 6A, only one electromagnetic mode is excited through the coupling elongated slot 1202. The magnetic field associated with the other potential mode is orthogonal to the elongated slot 1202 and is therefore decoupled and is not electromagnetically excited. The excited mode has the magnetic field oriented along the elongate slot 1202, and the electric field oriented normal to it. The resulting radiating field is linearly polarized. In comparison and with reference to FIGS. 6B and 6C, the modified resonator 1140 has a symmetry axis that defines the direction of the total E-field 1142, which does not coincide with the length direction of the elongated slot 1202. The decomposed E-field of the modified resonator 1140 has Eh 1144 and Ev 1146 components that are affected in different ways by the Dk distribution of the Dk medium 1300 along the respective directions. In particular, the Eh 144 component propagates along the lower Dk path (less high Dk of the Dk medium 1300, and more air), and the Ev 1146 component propagates along the higher Dk path, where the resulting effect is elliptic or circular polarization counterclockwise, as observed in the plan and view of FIG. 6C. As defined herein, FIGS. 7A and 7B depict representations of right-hand elliptical or circular polarized (RH-E/C-P) radiation (FIG. 7A), and left-hand elliptical or circular polarized (LH-E/C-P) radiation (FIG. 7B)

Reference is now made to FIG. 8, which depicts an EM device 2100 having a Dk medium 1300 disposed on a substrate 1200, where the Dk medium 1300 is a single unitary 3D Dk medium having an average dielectric constant greater than that of air, which in an embodiment may be a foam that includes air. As depicted in FIG. 8 and also described herein above, the at least one recessed portion 1304, 1306 defines locations of a first portion 1330 of the dielectric medium 1300 on one side of the at least one recessed portion 1304, 1306 and a second portion 1350 of the dielectric medium 1300 on an opposing side of the at least one recessed portion 1304, 1306; where each of the first portion 1330 and the second portion 1350 have cross sectional profiles, as observed in the rotated isometric view of FIG. 8, with vertical outer walls 1320 that extend upward from an upper surface 1208 of the substrate 1202. In an embodiment, at least one of the first portion 1330 and the second portion 1350 have an angled planar or curved top surface 1358. While FIG. 8 depicts surface 1358 as an angled planar surface, it will be appreciated from the description provided herein that the surface 1358 may alternatively be curved in a convex manner or a concave manner without the need for further illustration. In an embodiment, both the first portion 1330 and the second portion 1350 have angled planar or curved top surfaces 1358. In an embodiment, the angled planar or curved top surfaces 1358 are angled or curved downward from the at least one recessed portion 1304, 1306 toward an outermost edge 1322, 1324 of each respective first and second portion 1330, 1350. In an embodiment, the first and second portions 1330, 1350 may be distinctly defined with respect to each other by a vertical demarcation plane 1340 (depicted as a vertical line in FIG. 8, where the associated plane would extend generally into the paper) that centrally bifurcates the Dk medium 1300 and is parallel with the z-axis.

Figure 9A:
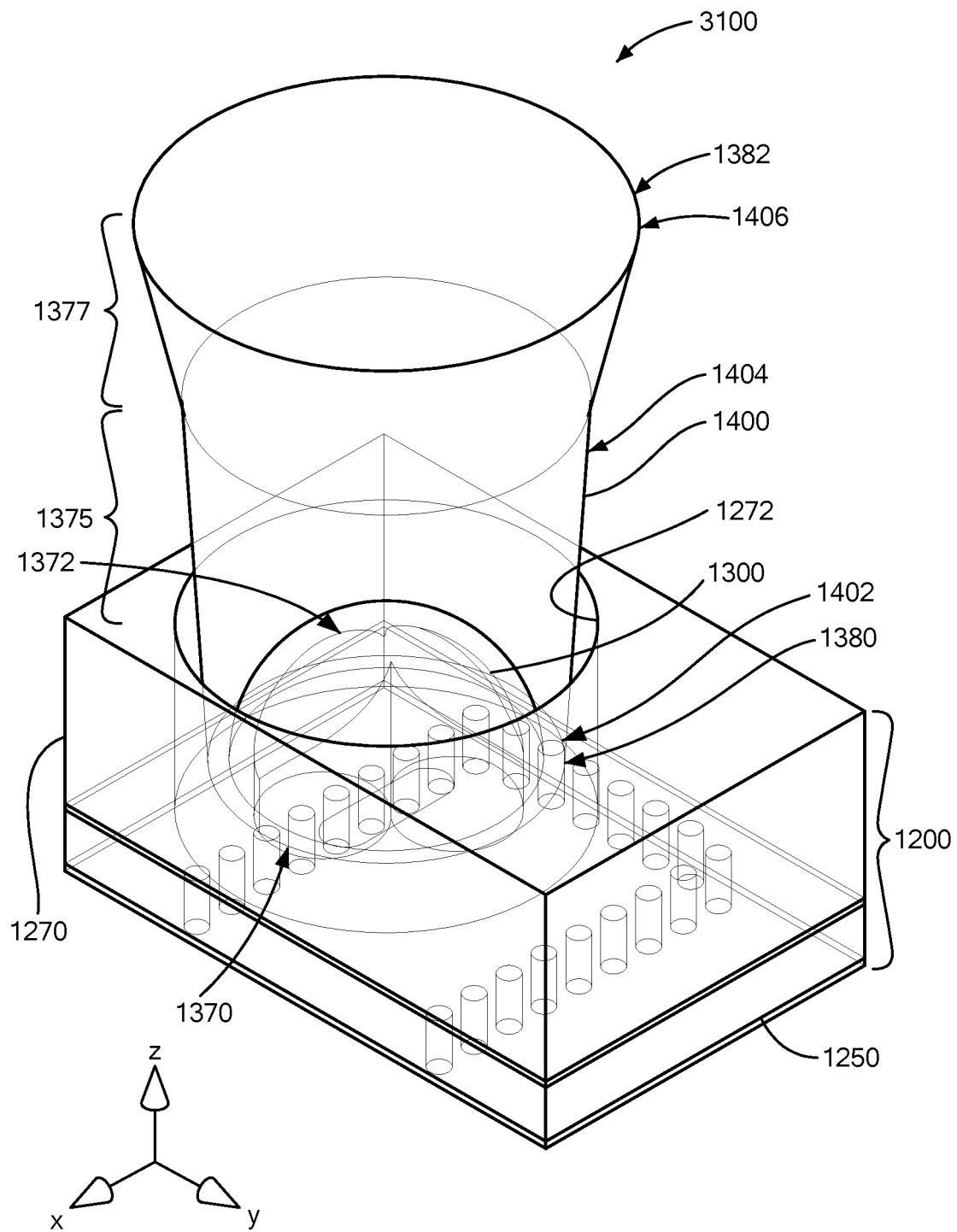
FIG. 9A depicts in transparent rotated isometric view an example EM device, in accordance with an embodiment.
Figure 9B:
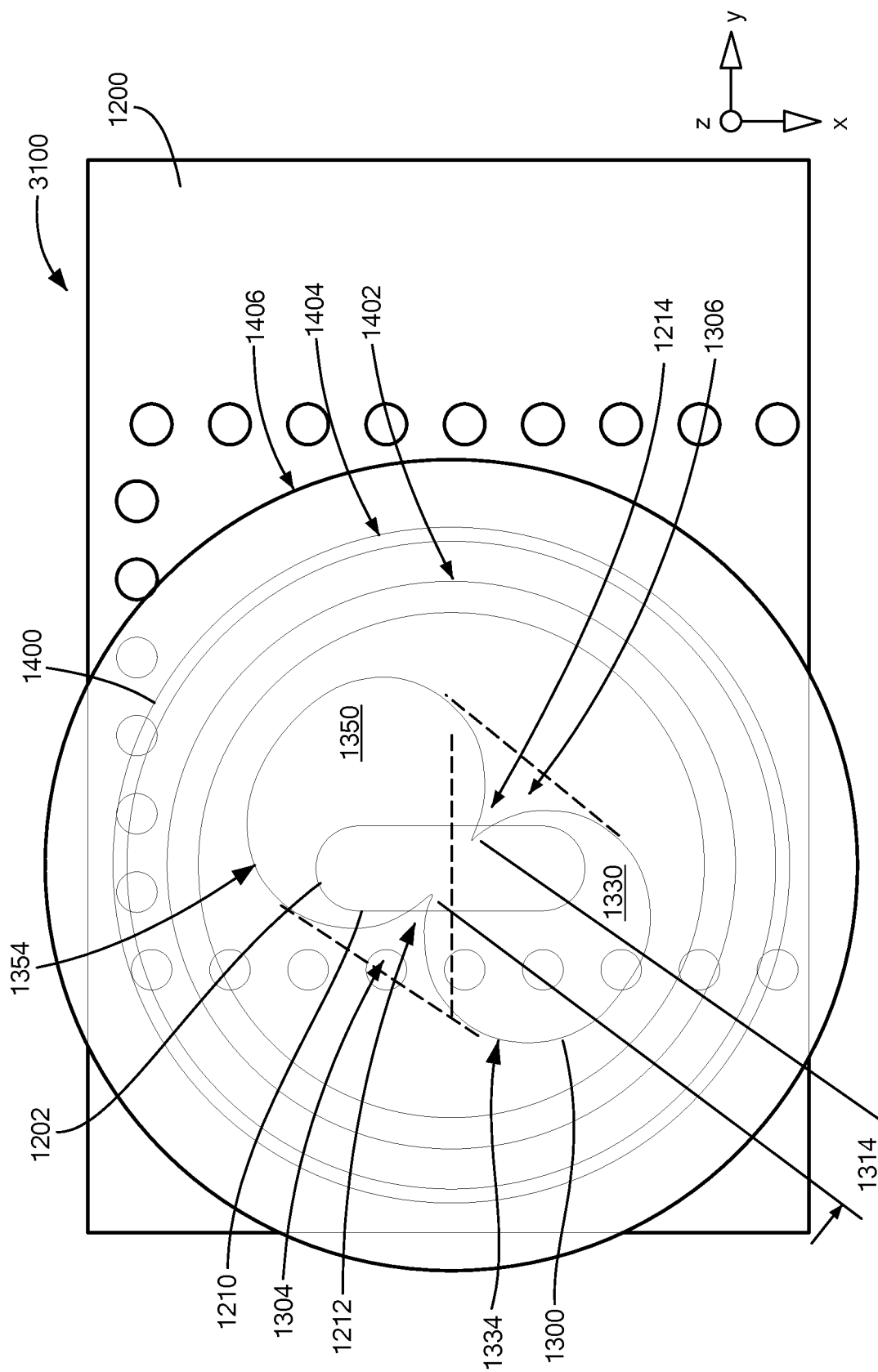
FIG. 9B depicts in transparent plan view the example EM device of FIG. 9A, in accordance with an embodiment.

Reference is now made to FIGS. 9A and 9B.

FIG. 9A depicts in transparent rotated isometric view an EM device 3100 similar to EM device 2100 but with some differences that will now be described. As depicted, the EM device 3100 has a Dk medium 1300 disposed on a substrate 1200, where the Dk medium 1300 is the single unitary 3D Dk medium described in reference to FIG. 8. In an embodiment, the Dk medium 1300 is a first Dk medium having a first Dk constant, and the EM device 3100 further includes a second Dk medium 1400 having a second Dk constant that is different from the first Dk constant, the second Dk medium 1400 disposed at least partially outboard of and at least partially enclosing the first Dk medium 1300. In an embodiment, the second Dk medium 1400 is disposed completely outboard of and completely encloses the first Dk medium 1300. In an embodiment, the second Dk constant is lower than the first Dk constant.

FIG. 9B depicts a top-down plan view of the EM device 3100 of FIG. 9A, where an edge 1210 of the elongated aperture 1202 extends beyond an outer boundary 1334, 1354 of the first Dk medium 1300 into the second Dk medium 1400, as depicted by arrows 1212, 1214. As depicted, the edge 1210 of the elongated aperture 1202 that extends beyond the outer boundary 1334, 1354 of the first Dk medium 1300 does so proximate the at least one recessed portion 1304, 1306. In an embodiment, the edge 1210 of the elongated aperture 1202 that extends beyond the outer boundary 1334, 1354 of the first Dk medium 1300 does so on both sides of the elongated aperture 1202, as also depicted by arrow 1212, 1214. In an embodiment and as depicted, the at least one recessed portion 1304, 1306 includes two recessed portions, 1304 and 1306, that oppose each other on opposing sides of the elongated aperture 1202 to form the neck 1314 (see also FIGS. 1B and 3A) in the first Dk medium 1300, and the edge 1202 of the elongated aperture 1200 that extends beyond the outer boundary 1334, 1354 of the first Dk medium 1300 does so proximate both sides 1212, 1214 of the neck 1314 of the first Dk medium 1300. In an embodiment, the first Dk medium 1300 and the second Dk medium 1400 are in direct intimate contact with each other.

Figure 9C:
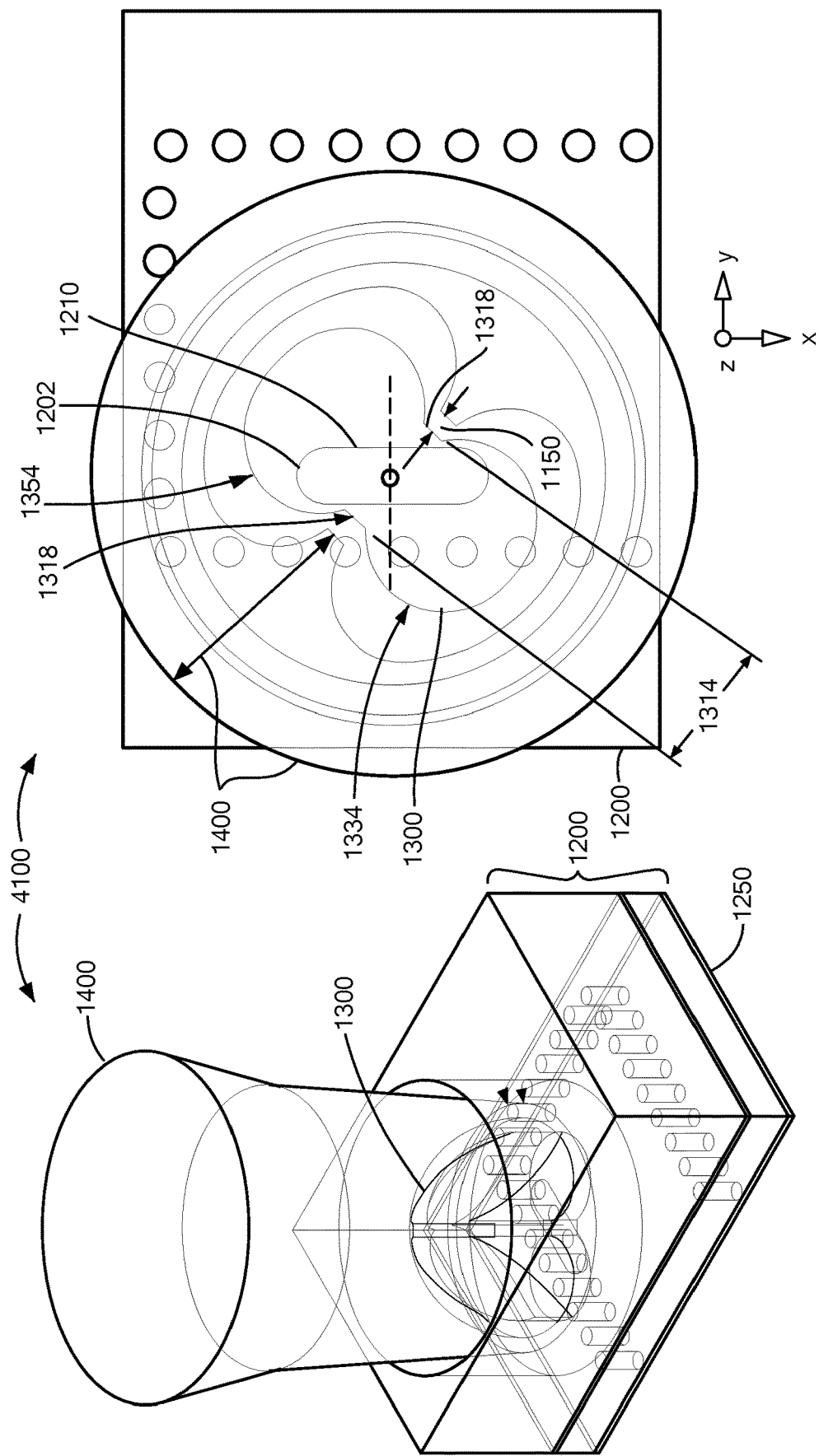
FIG. 9C depicts a transparent rotated isometric view, and a corresponding transparent plan view, of an example EM device similar but different to that of FIGS. 9A and 9B, in accordance with an embodiment.

Reference is now made to FIG. 9C, which depicts an EM device 4100 similar to the EM device 3100 depicted in FIGS. 9A and 9B, but with some differences that will now be described. As depicted and similar to EM device 3100, EM device 4100 has a first Dk medium 1300, a single unitary 3D Dk medium, disposed on a substrate 1200 and fully covering an elongated aperture 1202 in the substrate 1200. The first Dk medium 1300 of EM device 4100 differs from that of EM device 3100 in that the first Dk medium 1300 fully covers the elongated aperture 1202 in the region of the neck 1314 (i.e., the edge 1210 of the elongated aperture 1202 does not extend beyond an outer boundary 1334, 1354 of the first Dk medium 1300 into the second Dk medium 1400, contrary to that of EM device 3100. Compare FIG. 9C with FIG. 9B).

In an embodiment and as further depicted in FIG. 9C, the first Dk medium 1300 and the second Dk medium 1400 are at least partially separated from each other, and in an embodiment, the first Dk medium 1300 and the second Dk medium 1400 are completely separated from each other with a defined gap 1150 therebetween, which may be an air gap. In an embodiment and as observed in the plan view of the device, the at least one recessed portion 1304, 1306 includes two recessed portions, 1304 and 1306 (see FIG. 9B for example), that oppose each other on opposing sides of the elongated aperture 1202 to form a neck 1314 in the first Dk medium 1300, the neck 1314 having straight line portions 1318 on each side of the elongated aperture 1202 that are parallel to each other. In an embodiment, the straight line portions 1318 of the neck 1314 are neither perpendicular nor parallel to the direction of length L of the elongated aperture 1202 (see length L depicted in at least FIG. 1B for example). In an embodiment, the second Dk medium 1400 mimics the contour of the straight line portions 1318 of the neck 1314 in the vicinity of the neck 1314 (see contour at gap 1150 for example).

Reference is now made back to FIGS. 9A and 9B collectively, where the first Dk medium 1300 has a first proximal end 1370 proximate the substrate 1200, and a first distal end 1372 at a vertical distance away from the first proximal end 1370, and where the second Dk medium 1400 has a second proximal end 1380 proximate the substrate 1200, a second distal end 1382 at a vertical distance away from the second proximal end 1380 and at a vertical distance away from the first distal end 1372, and an intermediate region 1375 between the second proximal end 1380 and the second distal end 1382. In an embodiment: the cross sectional outer boundary 1334, 1354 of the first Dk medium 1300 (items 1334, 1354 depicted in FIG. 9B) is herein referred to as a first cross sectional outer boundary; the second proximal end 1380 of the second Dk medium 1400 has a second cross sectional outer boundary 1402, the intermediate region 1375 of the second Dk medium 1400 has a third cross sectional outer boundary 1404, and the second distal end 1382 of the second Dk medium 1400 has a fourth cross sectional outer boundary 1406; where the second cross sectional outer boundary 1402 is disposed radially outboard of the first cross sectional outer boundary 1334, 1354, and the fourth cross sectional outer boundary 1406 is larger than and disposed radially outboard of the second cross sectional outer boundary 1402 (best seen with reference to FIG. 9B). In an embodiment, the third cross sectional outer boundary 1404 is substantially the same as the second cross sectional outer boundary 1402, with the exception of a draft angle for molding or other fabrication methods. In an embodiment, the second cross sectional outer boundary 1402, the third cross sectional outer boundary 1404, and the fourth cross sectional outer boundary 1406, are all substantially circular or elliptical. In an embodiment, the second Dk medium 1400 transitions vertically from the third cross sectional outer boundary 1404 to the fourth cross sectional outer boundary 1406 with a structure similar to that of an inverted truncated cone 1377 (best seen with reference to FIG. 9B in combination with 9A). As used herein the phrase "substantially the same as" is intended to accommodate manufacturing or fabrication tolerances and/or molding draft tolerances, such that the phrase "substantially the same as" means "the same as" if said tolerances are zero. As used herein the phrase "substantially circular or elliptical" is intended to accommodate manufacturing or fabrication tolerances and/or molding draft tolerances, such that the phrase "substantially circular or elliptical" means "circular or elliptical" if said tolerances are zero.

With reference to FIG. 9A along with reference back to FIG. 5A, an embodiment of the substrate 1200 includes a signal feed substrate 1250 in the form of a SIW with an electrically conductive EM reflector 1270 disposed in electrical contact with an electrically conductive top layer 1222 (best seen with reference to FIGS. 1C-1H) of the signal feed substrate 1250. In an embodiment, the electrically conductive EM reflector 1270 includes a reflective wall 1272 that substantially surrounds the dielectric medium 1300. In an embodiment, a single dielectric medium 1300 is in a one-to-one correspondence with a single electrically conductive EM reflector 1270.

Figure 10A:
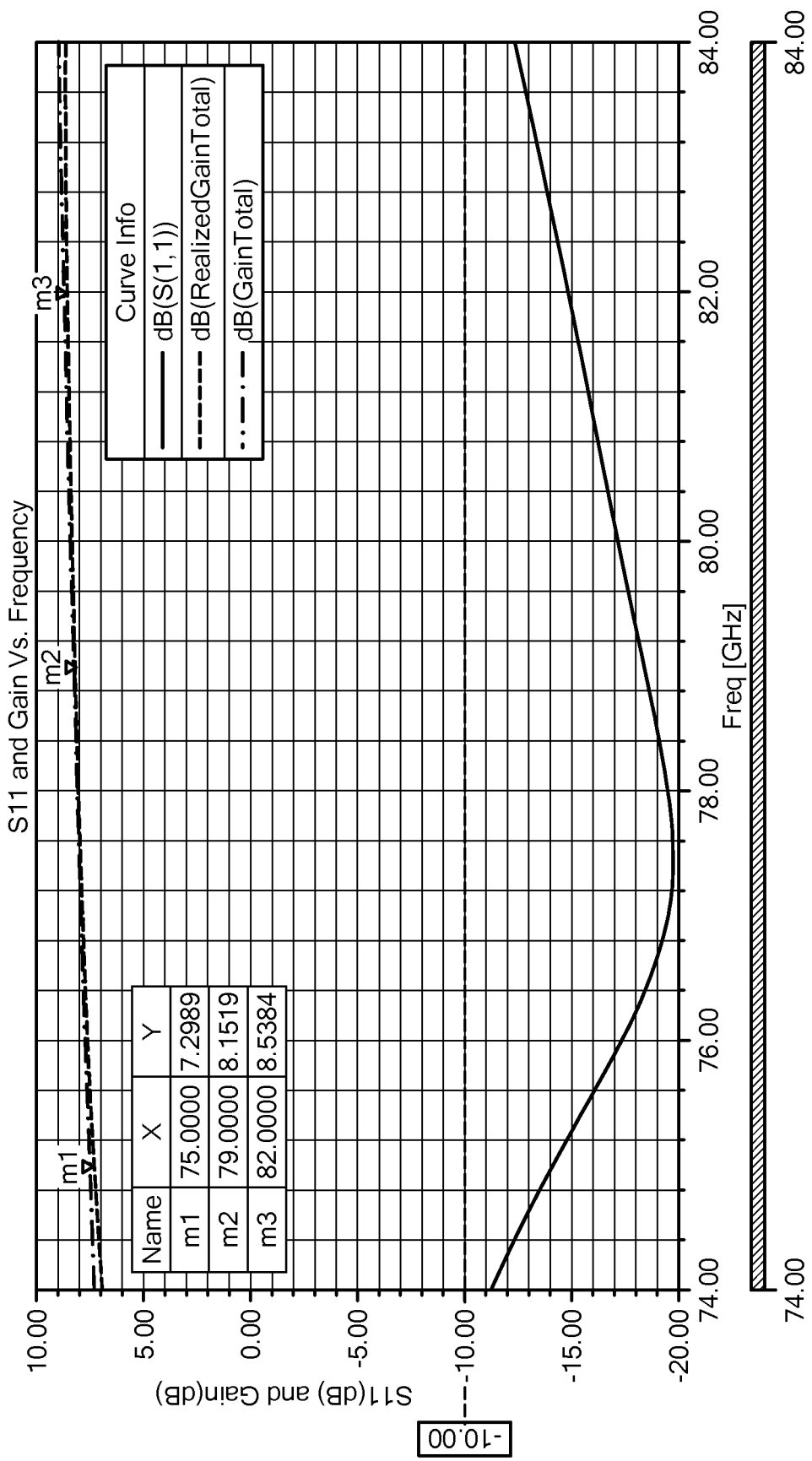
FIGS. 10A, 10B, and 10C, depict electromagnetic numerical modeling results of an example EM device, in accordance with an embodiment.
Figure 10B:
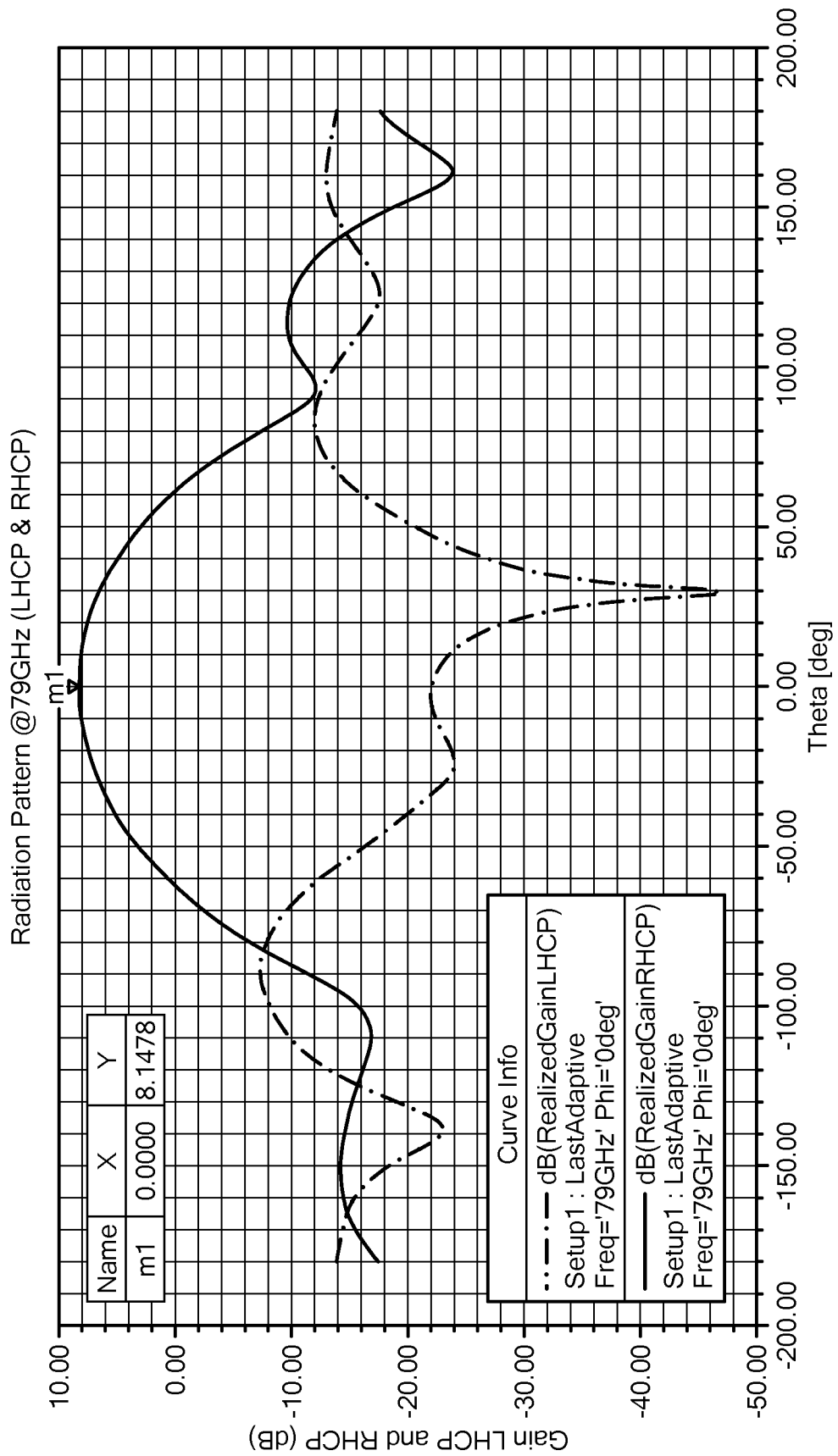
Figure 10C:
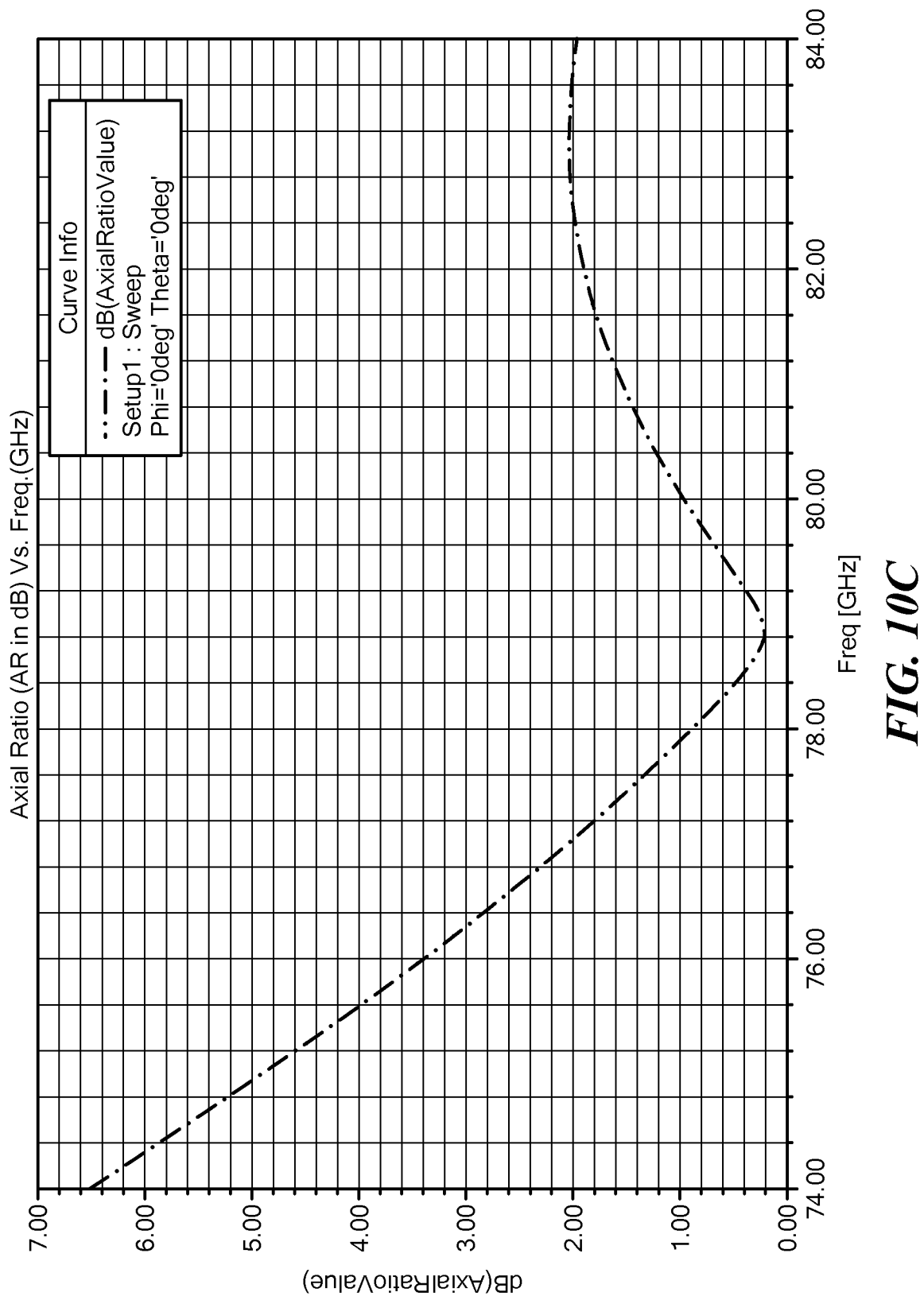

FIGS. 10A, 10B, and 10C, depict electromagnetic numerical modeling results of an embodiment that correlates with that depicted in FIG. 9A-B, where FIG. 10A depicts S11 return loss and Gain (dBi) versus operating frequency, FIG. 10B depicts Gain (dBi) of left-hand-circular-polarization (LHCP) and right-hand-circular-polarization (RHCP) versus angle theta, and FIG. 10C depicts Axial Ratio, AR, in dBi versus operating frequency. The value of AR is proportional to the ratio of orthogonal E-field components Ex, Ey, where ARαEx/Ey (the symbol α herein used as the symbol for proportionality). As an example, when Ex=Ey, then AR=1 and dBi=0. With respect to FIGS. 10A-10C, it will be appreciated that an embodiment consistent with the disclosure herein has a broadband far field radiation pattern greater than 7 dBi, a high gain RHCP and a low gain LHCP at angle theta of 0-degree, and a minimum AR at about 78.8 GHz.

While embodiments disclosed herein may be designed and/or modeled for performance at a particular radar frequency, it will be appreciated that embodiments disclosed herein may in general be applicable for use over a range of radar frequencies, such as from about 1 GHz to about 300 GHz for example; alternatively 1 GHz to 3 GHz, 3 GHz to 6 GHz, 6 GHz to 16 GHz, 8 GHz to 12 GHz, 10 GHz to 20 GHz, 20 GHz to 30 GHz, 30 GHz to 50 GHz, 50 GHz to 75 GHz, 55 GHz to 65 GHz, 70 GHz to 85 GHz, 76 GHz to 81 GHz, 85 GHz to 100 GHz, 100 GHz to 200 GHz, and 200 GHz to 300 GHz.

Reference is now made to FIGS. 11A and 11B, where FIG. 11A depicts a plan view of an array 5100, and FIG. 11B depicts a transparent rotated isometric view of the array 5100, where in an embodiment the array 5100 includes a plurality of the EM device 3100 depicted in FIGS. 9A-9B. While FIGS. 11A and 11B depict array 5100 having a plurality of a particular EM device, EM device 3100 for example, it will be appreciated that other EM devices consistent with the disclosure herein may also be represented by FIGS. 11A and 11B. As such, any array 5100 consistent with the disclosure herein is contemplated and considered to fall within the ambit of an invention disclosed herein. In an embodiment, corresponding ones of substrate 1200 are structurally and electrically connected with each other in a planar arrangement 5200 to provide a suitable signal feed in a manner known in the art. In an embodiment and consistent with a foregoing description, each one of the at least one recessed portion 1304, 1306 of a corresponding one of the Dk medium 1300 defines locations of a first portion 1330 of the corresponding Dk medium 1300 on one side of the at least one recessed portion 1304, 1306, and a second portion 1350 of the corresponding Dk medium 1300 on an opposing side of the at least one recessed portion 1304, 1306 (best seen with reference to FIG. 9B), and as observed in a plan view of the array 5100, a first set 5110 of the Dk medium 1300 have their corresponding first and second portions oriented in a first direction 5130 or a second direction 5140 relative to an x-y coordinate system of the array 5100, and a second set 5120 of the Dk medium 1300 have their corresponding first and second portions oriented in a first direction 5130 or a second direction 5140 relative to the x-y coordinate system, the second direction 5140 being different from the first direction 5130. In an embodiment, the first 5130 and second 5140 directions are neither perpendicular nor parallel to each other, as depicted in FIG. 11A. In an embodiment, the first 5130 and second 5140 directions are perpendicular to each other (best seen with reference to first 6130 and second 6150 directions depicted in FIG. 13C discussed herein below).

From the foregoing description of FIGS. 11A, 11B, it will be appreciated that an embodiment includes an arrangement where the first set 5110 of the Dk medium 1300 includes a first pair of closest adjacent ones of the Dk medium 1300 oriented in the first direction 5130, and where the second set 5120 of the Dk medium 1300 includes a second pair of closest adjacent ones of the Dk medium 1300 oriented in the second direction 5140. The proximity of the first set 5110 and the second set 5120 relative to each other can be seen by the intersection of corresponding ones of the second Dk medium 1400 at first and second locations 5112, 5122, for example.

Figure 12A:
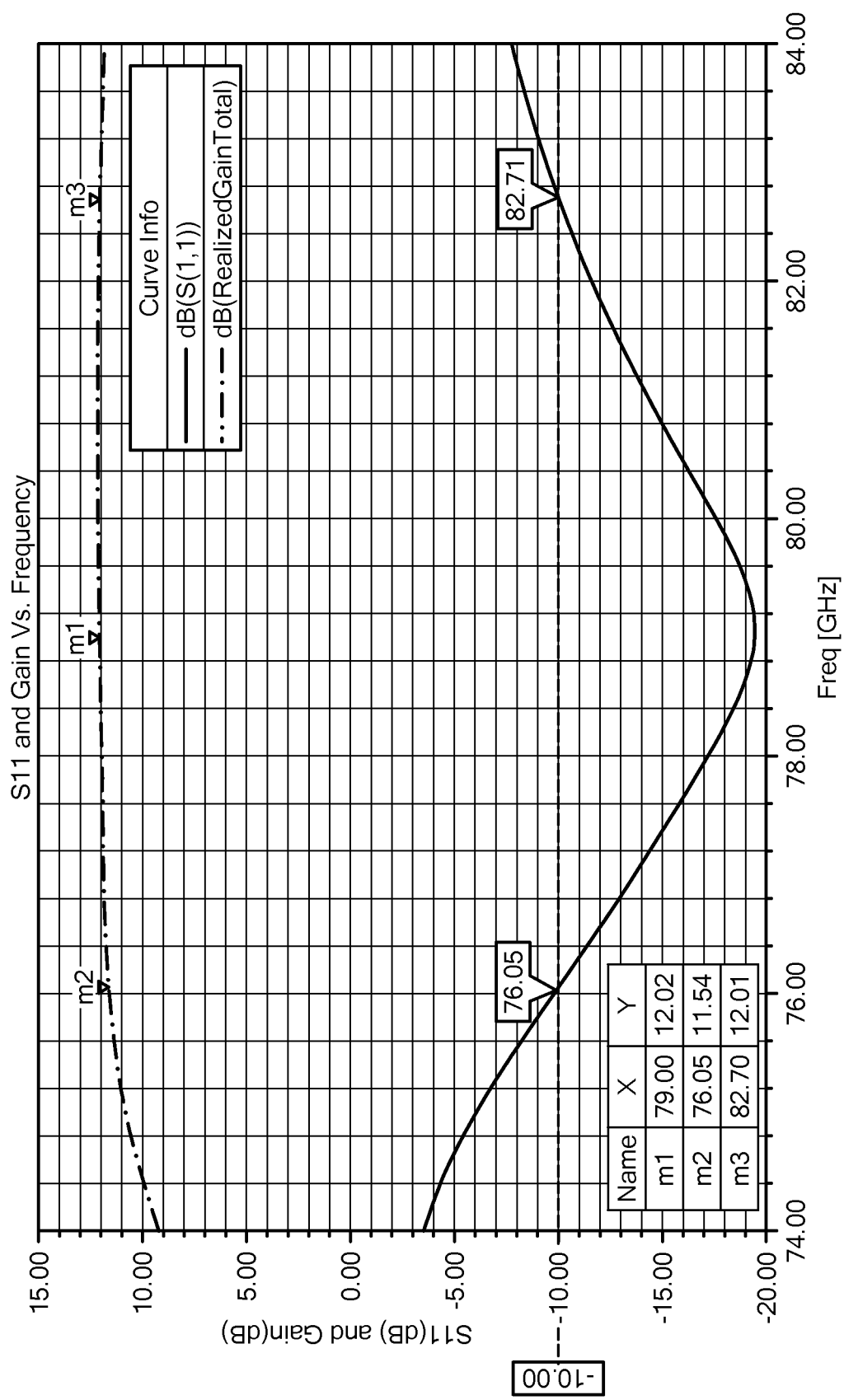
FIGS. 12A and 12B depict electromagnetic numerical modeling results of an example array of EM devices, in accordance with an embodiment.
Figure 12B:
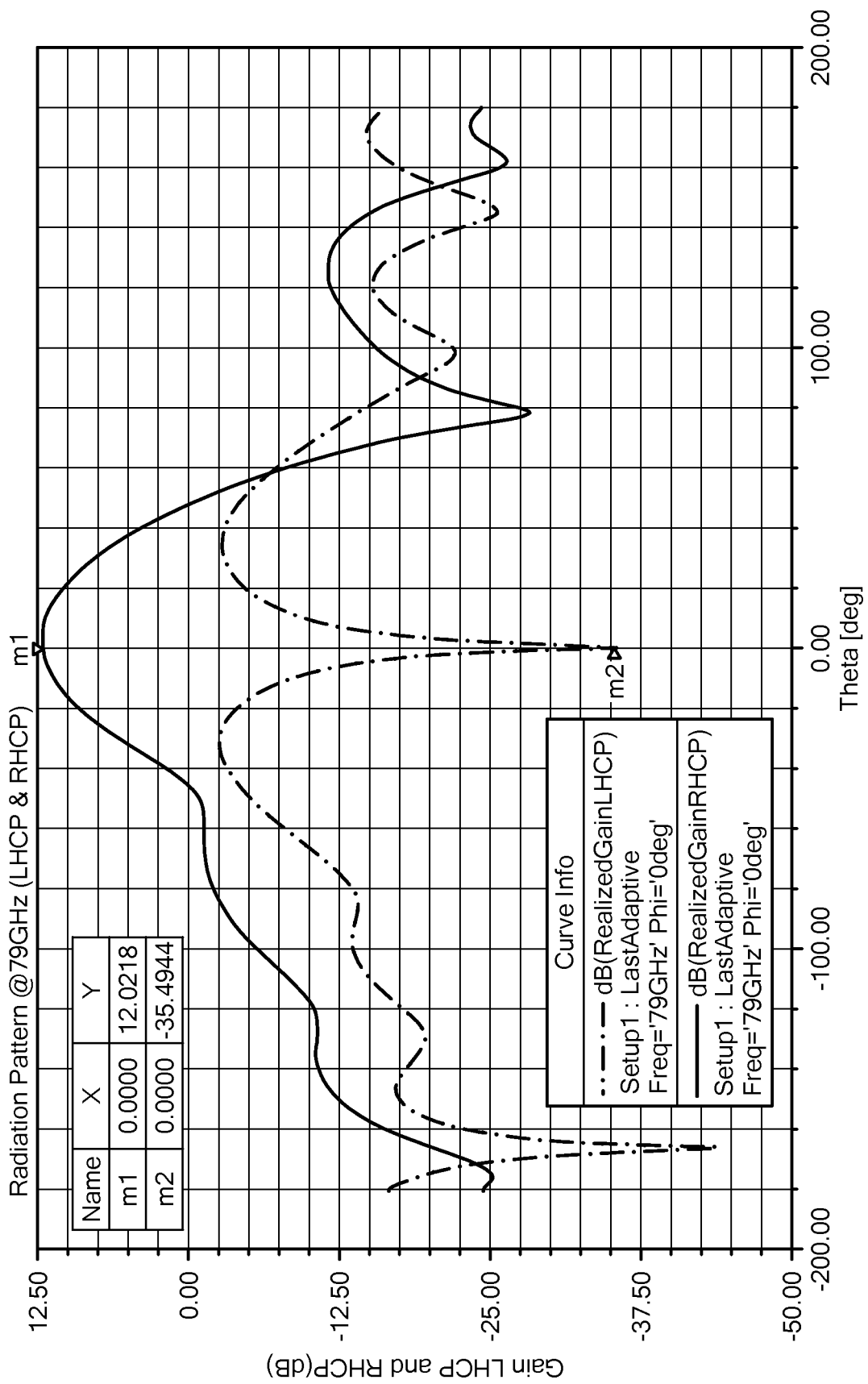

FIGS. 12A and 12B depict electromagnetic numerical modeling results of the array 5100 depicted in FIGS. 11A and 11B, where FIG. 12A correlates with FIG. 10A but for the array 5100, and FIG. 12B correlates with FIG. 10B but for the array 5100. The improvement in gain can be seen by comparing FIGS. 12A, 12B with FIGS. 10A, 10B.

Reference is now made to FIGS. 13A-13D collectively, where each figure depicts a 2×2 array 6100 of EM devices consistent with a disclosure herein but with some differences that will now be described.

Similar to the array 5100, the array 6100 includes a planar arrangement 5200 of substrates 1200 having a plurality of Dk medium 1390 disposed thereon that substantially covers corresponding ones of an elongated aperture 1202. As in other embodiments disclosed herein, each one of the at least one recessed portion 1304, 1306 of a corresponding one of the Dk medium 1390 defines locations of a first portion 1330 of the corresponding Dk medium 1390 on one side of the at least one recessed portion 1304, 1306, and a second portion 1350 of the corresponding Dk medium 1390 on an opposing side of the at least one recessed portion 1304, 1306. As observed in a plan view of the array 6100, a first set of the Dk medium 1390 have their corresponding first and second portions 1330, 1350 oriented in a first direction 6130 or a second direction 6150 relative to an x-y coordinate system of the array, and a second set of the Dk medium 1390 have their corresponding first and second portions 1330, 1350 oriented in a first direction 6130 or a second direction 6150 relative to the x-y coordinate system, the second direction 6150 being different from the first direction 6130.

In an embodiment and with particular reference to FIG. 13A, each Dk medium 1390 of the first and second sets of the Dk medium 1390.1, 1390.2, 1390.3, 1390.4 are oriented in the first direction 6130.

In an embodiment and with particular reference to FIG. 13B, each Dk medium 1390 of the first and second sets of the Dk medium 1390.1, 1390.2, 1390.3, 1390.4 are oriented in the second direction 6150.

Figure 13C:
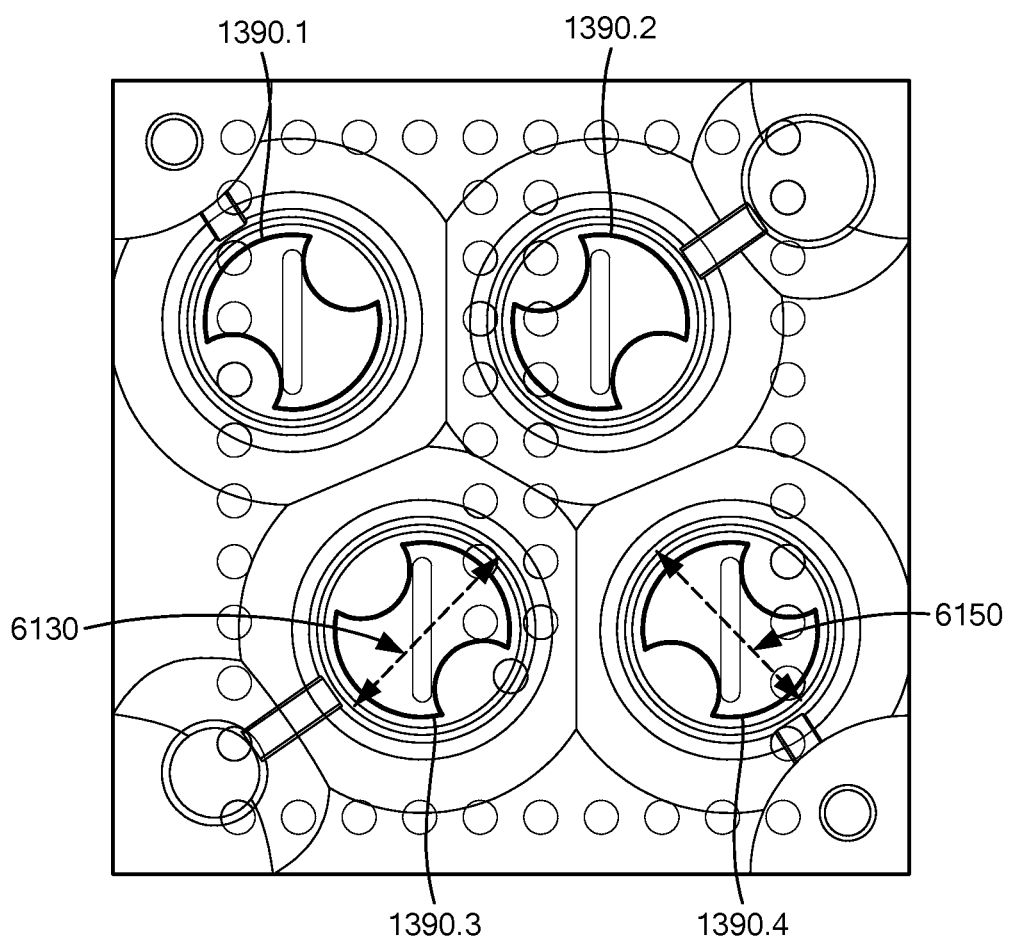

In an embodiment and with particular reference to FIG. 13C, the first set of the Dk medium 1390 include a first pair 1390.2, 1390.3 of closest diagonal ones of the Dk medium 1390 oriented in the first direction 6130, and the second set of the Dk medium 1390 includes a second pair 1390.1, 1390.4 of closest diagonal ones of the dielectric medium oriented in the second direction 6150.

As depicted in at least FIG. 13A or 13B, each first 1330 and second 1350 portion of a corresponding Dk medium 1390 has an outwardly curved outer boundary 1334, 1354 with a neck region 1314 disposed therebetween. In an embodiment, each corresponding neck region 1314 is formed by a continuation of the outwardly curved outer boundary 1334, 1354 of the corresponding Dk medium 1390. In an embodiment, each corresponding neck region 1314 is formed by an inwardly curved outer boundary 1392 of the corresponding dielectric medium. In an embodiment, each corresponding inwardly curved outer boundary 1392 is a continuation of a corresponding outwardly curved boundary 1334, 1354 of the corresponding Dk medium 1390.

Figure 13D:
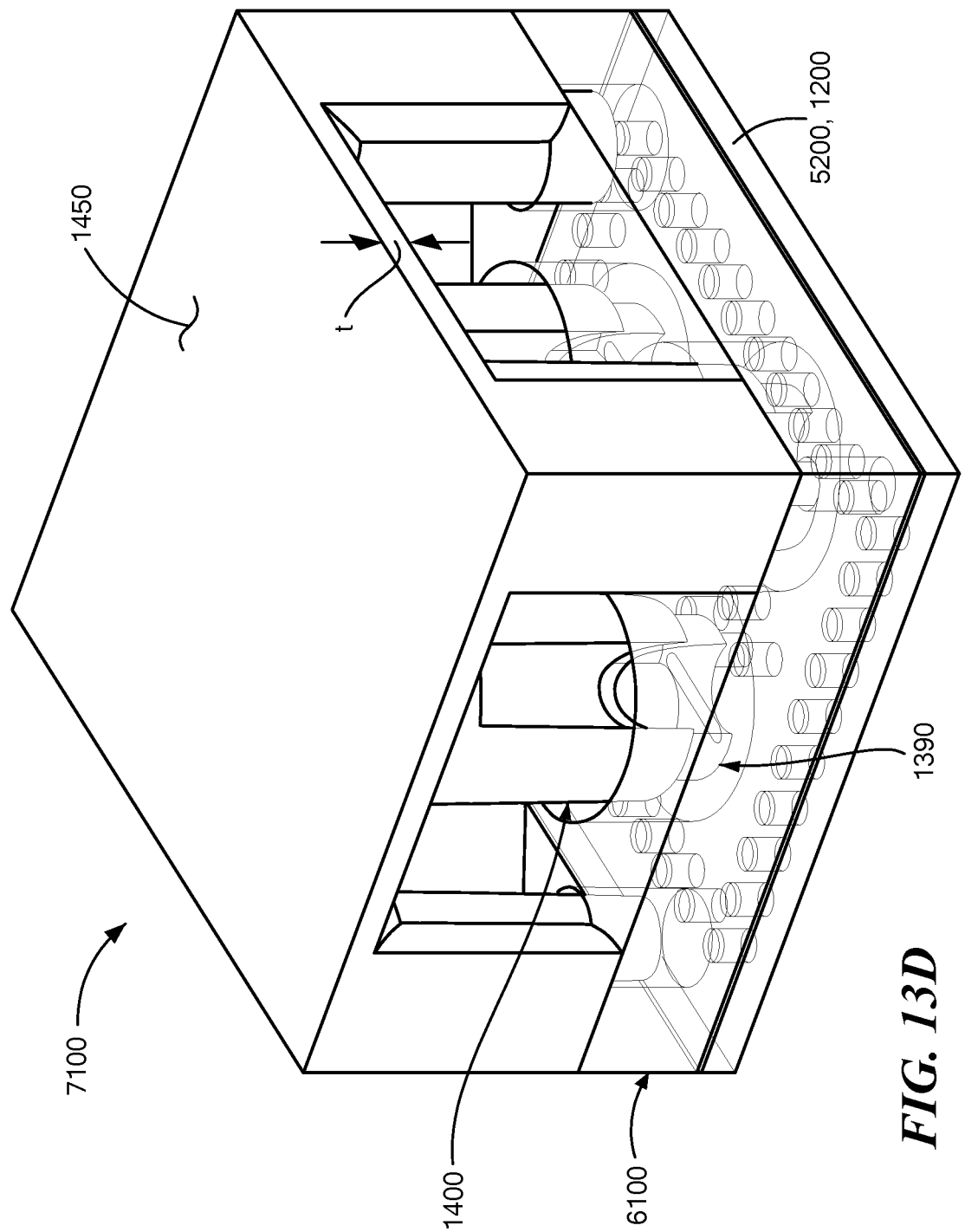
FIG. 13D depicts in semi-transparent rotated isometric view an example array of EM devices of one or more of FIGS. 13A-13C, in accordance with an embodiment.

Reference is now made to FIG. 13D, which depicts an EM device 7100 that includes any one of the arrays 6100 depicted in FIGS. 13A-13C, and where each corresponding one of the (first) Dk medium 1390 has a second Dk medium 1400 structurally coupled to and extending vertically from at least the distal end of the corresponding first Dk medium 1390 (see FIGS. 9A-9C, for example), where each second Dk medium 1400 is interconnected with adjacent ones of the second Dk medium 1400 by a relatively thin connecting structure 1450 having a thickness t, where thickness t is less than an operating wavelength λ of the EM device 7100 when the EM device 7100 is electromagnetically excited. In an embodiment, t is less than ½ times λ, alternatively less than ⅕ times λ, further alternatively less than ¹⁄₁₀ times λ. In an embodiment, the relatively thin connecting structure 1450 is disposed at a distal end of corresponding ones of the second Dk medium 1400 at a vertical distance away from the substrate 1200. In an embodiment, the relatively thin connecting structure 1450 is unitary and integral with the plurality of second Dk medium 1400 in the form of a monolithic.

Figure 14B:
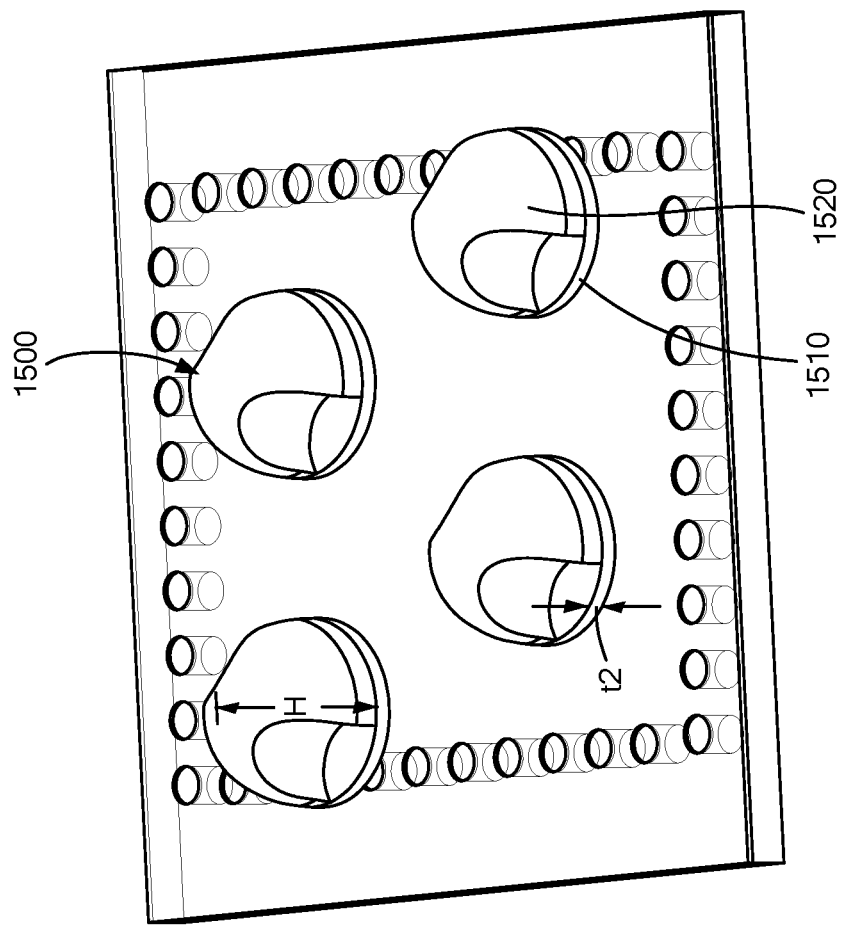
FIG. 14B depicts in solid rotated isometric view the example array of EM devices of FIG. 14A, in accordance with an embodiment.
Figure 14A:
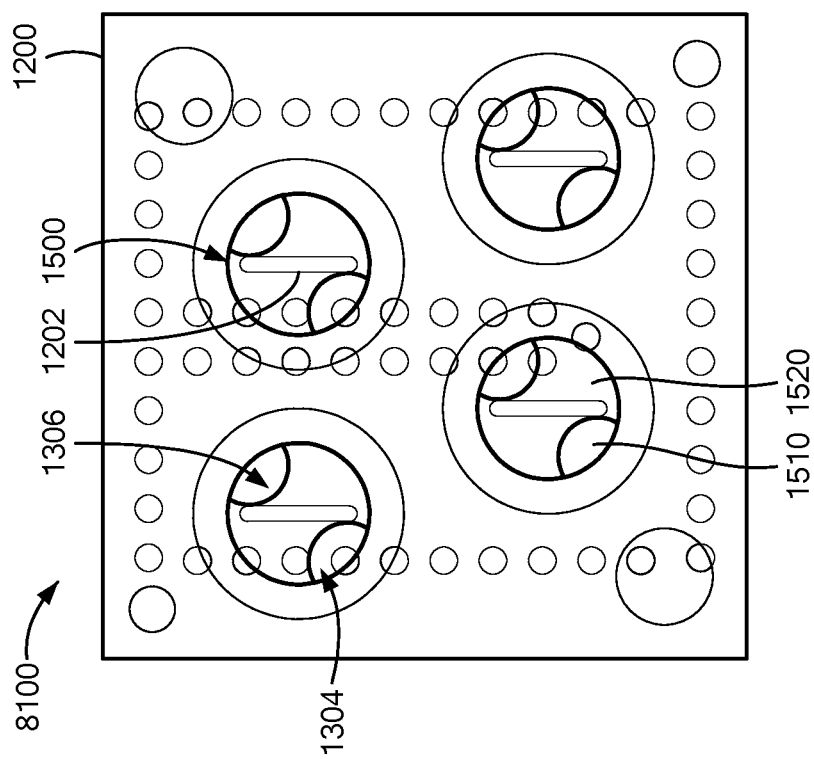
FIG. 14A depicts in transparent plan view an example array of EM devices, in accordance with an embodiment.

Reference is now made to FIGS. 14A and 14B collectively, where FIG. 14A depicts a transparent plan view of an array 8100 with a plurality of Dk medium 1500 depicted in transparent view disposed on a substrate 1200 substantially covering corresponding ones of an elongated aperture 1202, and FIG. 14B depicts a solid rotated isometric view of the array 8100 of FIG. 14A with the Dk medium 1500 depicted in solid view. As depicted, the Dk medium 1500 has a base portion 1510 and an electromagnetic resonator portion 1520 (also herein referred to as a DRA), where both portions 1510, 1520 are formed from a dielectric material other than air and are integrally formed with each other. The resonator portion 1520 includes the aforementioned at least one recessed portion 1304, 1306, while the base portion 1510 is absent the same at least one recessed portion 1304, 1306. The base portion 1510 and resonator portion 1520 form a unitary monolithic structure. In an embodiment, the base portion 1510 is relatively thin with respect to a height of the resonator portion 1520. In an embodiment, the base portion 1510 has a thickness t2 and the resonator portion 1520 has a height H, where t2 is less than ⅕ times H. alternatively t2 is less than ¹⁄₁₀ times H, alternatively t2 is less than an operating wavelength λ2 of the array 8100 when the array 8100 is electromagnetically excited. In an embodiment, t2 is less than ½ times λ2, alternatively less than ⅕ times λ2, further alternatively less than ¹⁄₁₀ times λ2.

In view of all of the foregoing, it will be appreciated that the Dk medium, or first Dk medium, of any embodiment disclosed herein where the Dk medium is disposed on the corresponding substrate substantially covering a corresponding elongated aperture, forms a dielectric resonator portion of the corresponding EM device.

Figure 15:
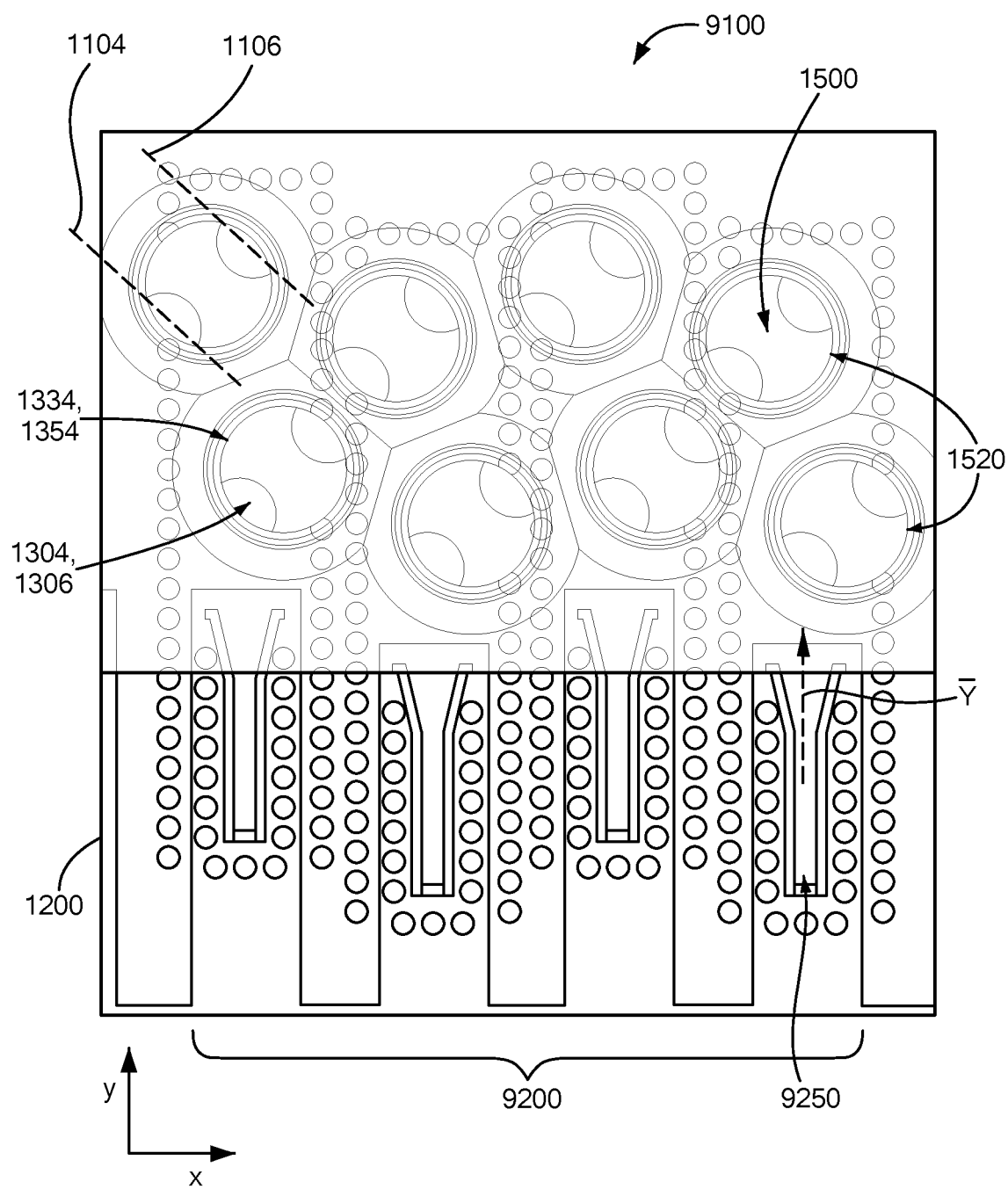
FIG. 15 depicts an example EM apparatus for use with one or more of the EM devices disclosed herein, in accordance with an embodiment.

Reference is now made to FIG. 15, which depicts a plan view of an EM apparatus 9100 with a substrate 1200 having multiple adjacent electromagnetic signal channels 9200, each channel comprising one or more dielectric resonator antennas, DRAs, 1520 with an associated electromagnetic feed structure 9250 configured to have a direction of propagation, $\overline{Y}$, of an electromagnetic field toward the one or more DRAs 1520. Each DRA 1520 of the one or more DRAs has a dielectric structure consistent with an embodiment disclosed herein configured to produce in response to an electromagnetic signal on a corresponding electromagnetic feed structure 9250 at least one of; circularly polarized electromagnetic radiation, and elliptically polarized electromagnetic radiation. While FIG. 15 depicts a particular structure for the DRA 1520, it will be appreciated from all of the foregoing that other Dk mediums described and illustrated herein as being useful as a dielectric resonator may be applied in place of the DRA 1520 depicted in FIG. 15, consistent with an embodiment disclosed herein.

In an embodiment, the DRA 1520 includes a Dk medium 1500 other than air disposed on the substrate 1200 in electromagnetic signal communication with the electromagnetic feed structure 9250, the Dk medium 1500 having a cross sectional boundary 1334, 1354 as viewed in the plan view of the apparatus 9100, the cross sectional boundary 1334, 1354 having at least one recessed portion 1304, 1306 that recesses inward toward a center of the Dk medium 1500 away from a tangent line 1104, 1106 that partially bounds the cross sectional boundary 1334, 1354; wherein the direction of propagation, $\overline{Y}$, is not perpendicular to the tangent line 1104, 1106 and is not parallel to the tangent line 1104, 1106.

Figure 16A:
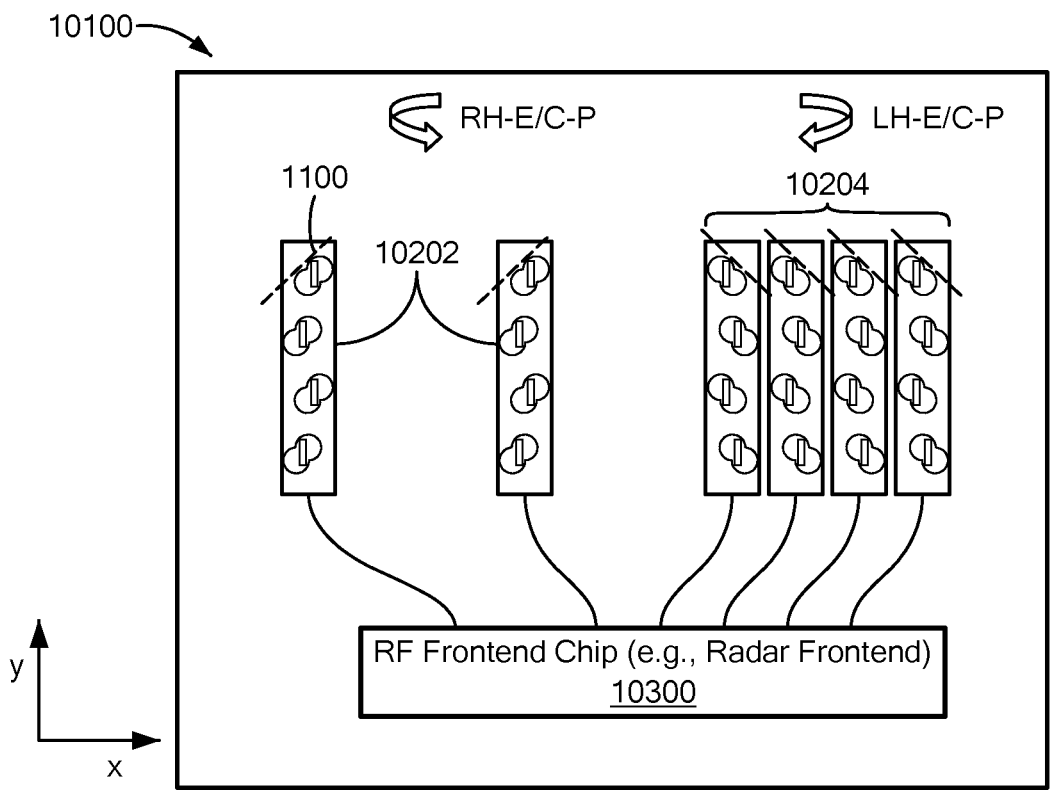
FIG. 16A depicts a radar assembly apparatus of an example EM apparatus for use with one or more of the EM devices disclosed herein, with transmit (Tx) and receive (Rx) channels of opposite polarization sense, in accordance with an embodiment.
Figure 16B:
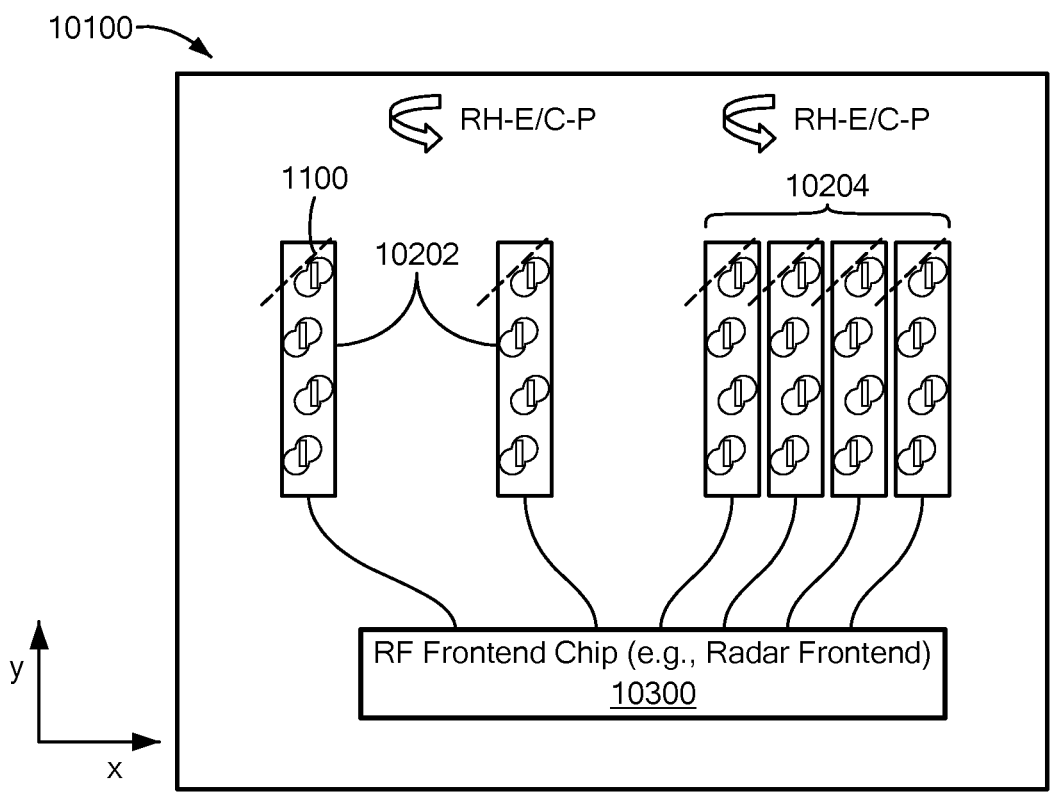
FIG. 16B depicts a radar assembly apparatus similar to that of FIG. 16A, but with Tx and Rx channels of same polarization sense, in accordance with an embodiment.

In an embodiment, the apparatus 9100 is configured as a radar system. In an embodiment, one or more of the multiple adjacent electromagnetic signal channels 9200 are receive channels of a radar system. In an embodiment, one or more of the multiple adjacent electromagnetic signal channels 9200 are transmit channels of a radar system. In an embodiment, the apparatus 9100 is a communication system. In an embodiment, one or more of the multiple adjacent electromagnetic signal channels 9200 are receive channels of a communication system. In an embodiment, one or more of the multiple adjacent electromagnetic signal channels 9200 are transmit channels of a communication system Reference is now made to FIGS. 16A-16B, which depict plan views of an example EM apparatus 10100 similar to that of EM apparatus 9100 and configured as a radar assembly apparatus for use with one or more of any EM device configured as disclosed herein (generally referred to as EM device 1100, but understood to include any EM device as configured and disclosed herein). Like elements are depicted and illustrated alike. As depicted in FIGS. 16A and 16B, the EM apparatus 10100 includes an array of transmit (Tx) channels 10202 of EM devices 1100 (configured as disclosed herein), and an array of receive (Rx) channels 10204 of EM devices 1100 (configured as disclosed herein). In each of FIGS. 16A and 16B, The Tx and Rx channels 10202, 10204 are electromagnetically driven by an RF (Radio Frequency) frontend chip 10300 (e.g., a radar frontend), which includes any RF frontend chip or radar frontend available and known in the art (see for example products, such as AWR1642, AWR1243, IWR6843, available at Texas Instruments, Inc., Texas, USA)). In each of FIGS. 16A and 16B, the EM apparatus 10100 may be provided in the form of a printed circuit board (PCB) or an electronic packaged assembly, or in any other form suitable for a purpose disclosed herein.

As depicted in FIG. 16A, the Tx channels 10202 are configured to produce a right-hand sense elliptical or circular polarized (RH-E/C-P) EM radiation, and the Rx channels 10204 are configured to produce a left-hand sense elliptical or circular polarized (LH-E/C-P) EM radiation, in accordance with an embodiment disclosed herein. Stated alternatively, the Tx channels 10202 and the Rx channels 10204 depicted in FIG. 16A are configured with opposite polarization sense, which may be RH-E/C-P and LH-E/C-P, or LH-E/C-P and RH-E/C-P, respectively, in accordance with an embodiment.

As depicted in FIG. 16B, the Tx channels 10202 are configured to produce a right-hand sense elliptical or circular polarized (RH-E/C-P) EM radiation, and the Rx channels 10204 are configured to produce a right-hand sense elliptical or circular polarized (RH-E/C-P) EM radiation, in accordance with an embodiment disclosed herein. Stated alternatively, the Tx channels 10202 and the Rx channels 10204 depicted in FIG. 16B are configured with same polarization sense, which may be RH-E/C-P and RH-E/C-P, or LH-E/C-P and LH-E/C-P, respectively, in accordance with an embodiment.

While FIGS. 16A and 16B depict certain arrangements productive of RH-E/C-P and LH-E/C-P, it will be appreciated that these depictions are for illustration purposes only, and that other depictions of RH-E/C-P and LH-E/C-P consistent with the disclosure herein as a whole are contemplated as long as they fall within a scope of the appended claims.

While FIGS. 16A and 16B depict two Tx channels 10202 each having four EM devices 1100, and four Rx channels 10204 each having four EM devices 1100, it will be appreciated that this is for illustration purposes only, and that a scope of an invention disclosed herein may encompass any number of Tx channels and any number of Rx channels, each with any number of EM devices, that falls within the scope of the appended claims.

Figure 16C:
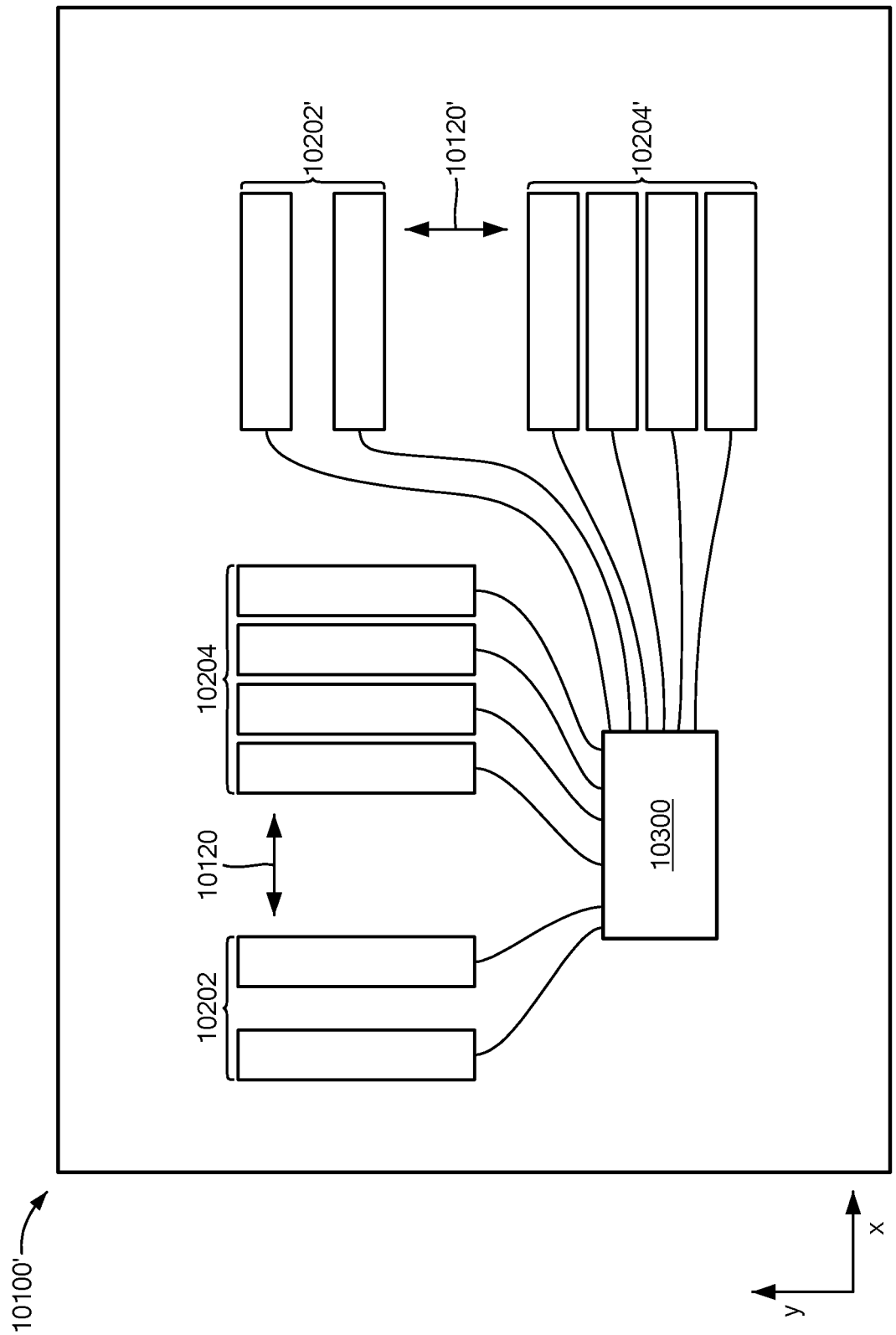
FIG. 16C depicts a radar assembly apparatus similar to those of FIGS. 16A and 16B, but with additional orthogonally arranged Tx and Rx channels, in accordance with an embodiment.

Reference is now made to FIG. 16C, which depicts an arrangement of an EM apparatus 10100' similar to that of FIGS. 16A and 16B where a set of Tx and Rx channels 10202, 10204 are oriented parallel to (along) the y-axis, but also with a similar set of Tx and Rx channels 10202', 10204' oriented parallel to (along) the x-axis. As will be appreciated by one skilled in the art, the orientation of the Tx and Rx channels establishes the direction of propagation of the transmitted and received radar channels, where the direction of propagation is oriented perpendicular to the lengthwise direction of the channel array as indicated by signal direction lines 10120, 10120', respectively. While the two sets of Tx and Rx channels depicted in FIG. 16 C are oriented orthogonal to each other, it will be appreciated that this is for illustration purposes only, and that other angular orientations are possible and contemplated, which would provide for a wide angular range of radar scans.

From the foregoing description of FIGS. 16A-16C in combination with other associated figures, it will be appreciated that embodiments disclosed herein include an apparatus configured in the form of a radar system. In an embodiment, one or more of the multiple adjacent signal channels are configured as transmit channels of the radar system, where in an embodiment, the transmit channels comprise structure configured to be productive of: left-hand elliptical or circular polarized far field electromagnetic radiation; or, right-hand elliptical or circular polarized far field electromagnetic radiation. In an embodiment, one or more of the multiple adjacent signal channels are configured as receive channels of the radar system, where in an embodiment, the receive channels comprise structure configured to be productive of: left-hand elliptical or circular polarized far field electromagnetic radiation; or, right-hand elliptical or circular polarized far field electromagnetic radiation. In an embodiment, each of the multiple adjacent signal channels are electromagnetically driven by an RF frontend chip, where in an embodiment, the RF frontend chip is electromagnetically steerable via phase shifting or time delay. In an embodiment, the multiple adjacent electromagnetic signal channels comprise a first set of the signal channels disposed in a first lengthwise orientation, and a second set of the signal channels disposed in a second lengthwise orientation in a different orientation to the first lengthwise orientation. In an embodiment, the multiple adjacent electromagnetic signal channels comprise a first set of the signal channels disposed in a first lengthwise orientation, and a second set of the signal channels disposed in a second lengthwise orientation orthogonal to the first lengthwise orientation. In an embodiment, the first set of signal channels comprises a first set of transmit signal channels, and a first set of receive signal channels; and, the second set of signal channels comprises a second set of transmit signal channels, and a second set of receive signal channels. In an embodiment, the second set of transmit signal channels are disposed, in a lengthwise orientation, orthogonal to the first set of transmit signal channels; and, the second set of receive signal channels are disposed, in a lengthwise orientation, orthogonal to the first set of receive signal channels.

Figure 17A:
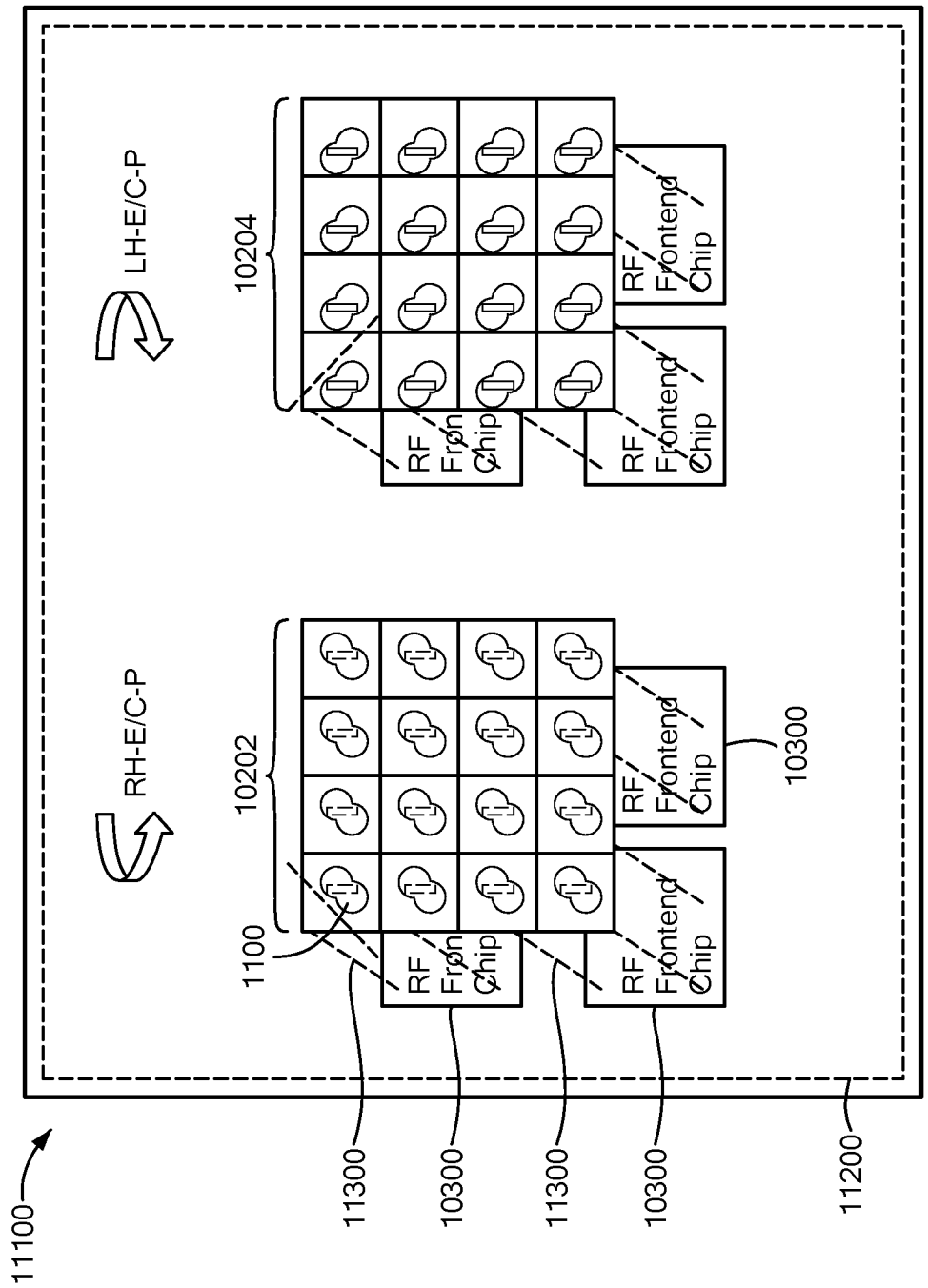
FIG. 17A depicts a communication assembly apparatus of an example EM apparatus for use with one or more of the EM devices disclosed herein, with Tx and Rx antenna elements of opposite polarization sense, in accordance with an embodiment.
Figure 17B:
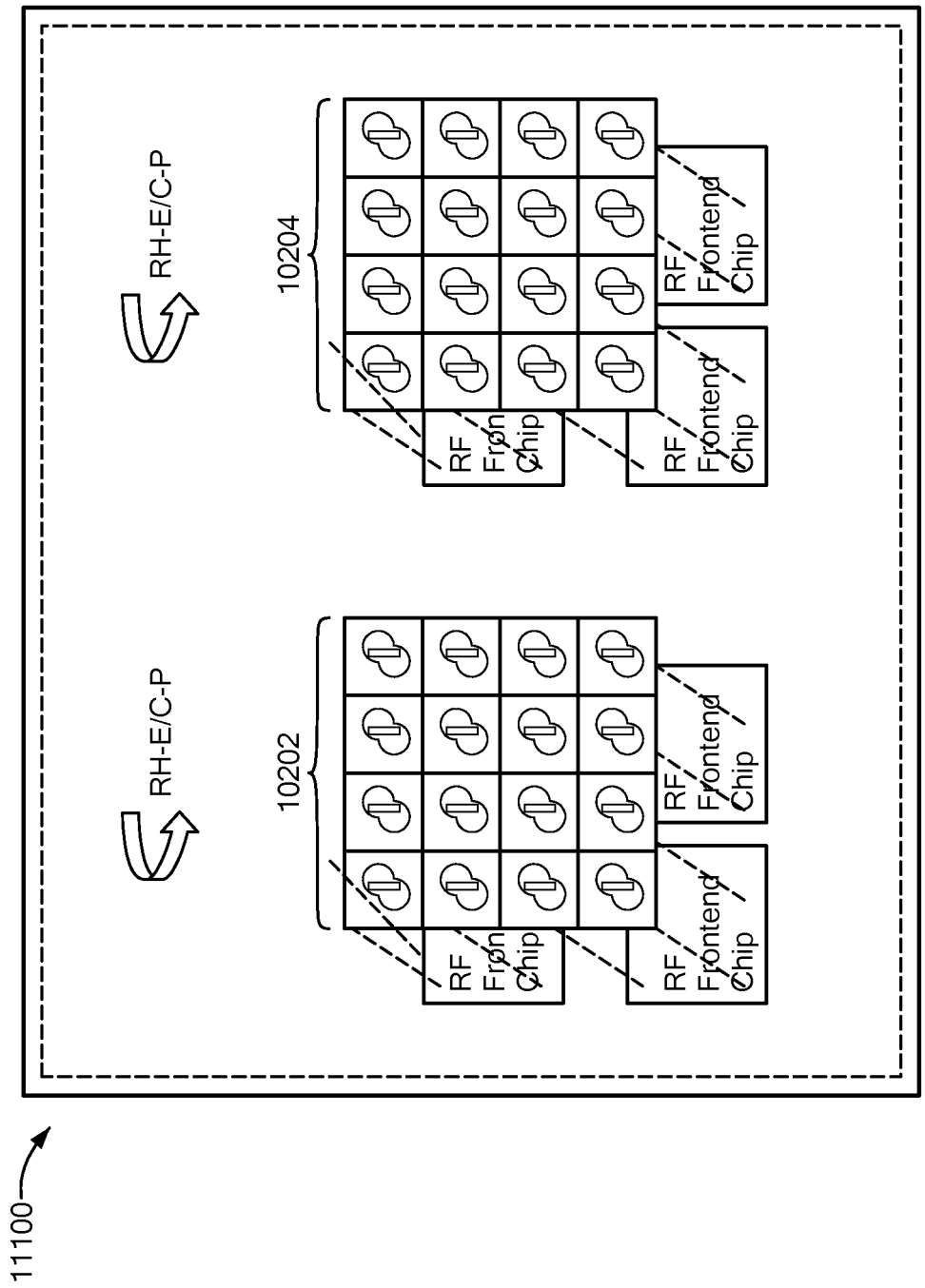
FIG. 17B depicts a communication assembly apparatus similar to that of FIG. 17A, but with Tx and Rx antenna elements of same polarization sense, in accordance with an embodiment.
Figure 17C:
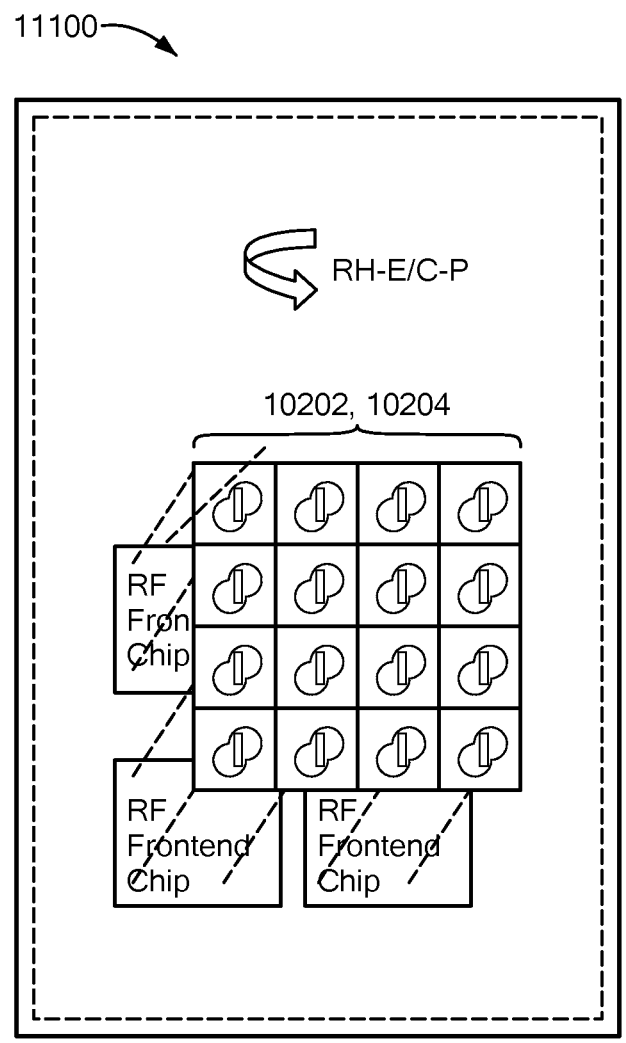
FIG. 17C depicts a communication assembly apparatus similar to that of FIG. 17B, but with common Tx and Rx antenna elements, in accordance with an embodiment.

Reference is now made to FIGS. 17A, 17B, and 17C, which depict plan views of an example EM apparatus 11100 similar to that of EM apparatus 10100, 9100 and configured as a communication assembly apparatus for use with one or more of any EM device configured as disclosed herein (generally referred to as EM device 1100, but understood to include any EM device as configured and disclosed herein). Like elements are depicted and illustrated alike. As depicted in FIGS. 17A and 17B, the EM apparatus 11100 includes an array of Tx channels 10202 of EM devices 1100 (configured as disclosed herein), and a distinctly separate array of Rx channels 10204 of EM devices 1100 (configured as disclosed herein). As depicted int FIG. 17C, the EM apparatus 11100 includes a combined array of both Tx channels 10202 and Rx channels 10204 of EM devices 1100 (configured as disclosed herein). That is, each EM device 1100 of the EM apparatus 11100 depicted in FIG. 17C operates as both a transmitter (Tx) and a receiver (Rx). Similar to the embodiments depicted in FIGS. 16A-16B, the Tx and Rx channels 10202, 10204 of EM apparatus 11100 are electromagnetically driven by an RF frontend chip 10300. As depicted in FIGS. 17A-17C, sets (such as, but not limited to, sets of four, for example) of the Tx and Rx channels 10202, 10204 are driven by a dedicated RF frontend chip 10300. In an embodiment, the RF frontend chips 10300 include an EM steerable function, such as phase shifting or time delay, that is applied to the EM signals directed to each EM device 1100 (i.e., antenna element). In an embodiment, the EM apparatus 11100 may be provided in the form of a PCB or an electronic packaged assembly, or in any other form suitable for a purpose disclosed herein. In an embodiment, the RF frontend chips 10300 may be attached to the back of an RF PCB 11200. In an embodiment, the structure for EM signal transmission to the EM devices 1100 (i.e., antenna elements) may include electrically conductive vias 11300 from a backside of an RF PCB (see vias 1224 depicted in FIGS. 1C, 1G, and 1H, for example).

As depicted in FIG. 17A, the Tx channels 10202 are configured to produce a right-hand sense elliptical or circular polarized (RH-E/C-P) EM radiation, and the Rx channels 10204 are configured to produce a left-hand sense elliptical or circular polarized (LH-E/C-P) EM radiation, in accordance with an embodiment disclosed herein. Stated alternatively, the Tx channels 10202 and the Rx channels 10204 depicted in FIG. 17A are configured with opposite polarization sense, which may be RH-E/C-P and LH-E/C-P, or LH-E/C-P and RH-E/C-P, respectively, in accordance with an embodiment.

As depicted in FIG. 17B, the Tx channels 10202 are configured to produce a right-hand sense elliptical or circular polarized (RH-E/C-P) EM radiation, and the Rx channels 10204 are configured to produce a right-hand sense elliptical or circular polarized (RH-E/C-P) EM radiation, in accordance with an embodiment disclosed herein. Stated alternatively, the Tx channels 10202 and the Rx channels 10204 depicted in FIG. 17B are configured with same polarization sense, which may be RH-E/C-P and RH-E/C-P, or LH-E/C-P and LH-E/C-P, respectively, in accordance with an embodiment.

As depicted in FIG. 17C, the combined array of Tx channels 10202 and Rx channels 10204 having common Tx and Rx antenna elements are collectively configured to produce a right-hand sense elliptical or circular polarized (RH-E/C-P) EM radiation, in accordance with an embodiment disclosed herein. Stated alternatively, the combined array of Tx channels 10202 and the Rx channels 10204 depicted in FIG. 17C are configured with same polarization sense, which may be RH-E/C-P and RH-E/C-P, or LH-E/C-P and LH-E/C-P, respectively, in accordance with an embodiment.

While FIGS. 17A-17C depict certain arrangements productive of RH-E/C-P and LH-E/C-P, it will be appreciated that these depictions are for illustration purposes only, and that other depictions of RH-E/C-P and LH-E/C-P consistent with the disclosure herein as a whole are contemplated as long as they fall within a scope of the appended claims.

While FIGS. 17A-17C depict a certain number of Tx channels 10202 each having a certain number of EM devices 1100, and a certain number of Rx channels 10204 each having a certain number of EM devices 1100, it will be appreciated that this is for illustration purposes only, and that a scope of an invention disclosed herein may encompass any number of Tx channels and any number of Rx channels, each with any number of EM devices, that falls within the scope of the appended claims.

From the foregoing description of FIGS. 17A-17C in combination with other associated figures, it will be appreciated that embodiments disclosed herein include an EM apparatus configured in the form of a communication system. In an embodiment, one or more of the multiple adjacent signal channels are configured as transmit channels of the communication system, where in an embodiment, the transmit channels comprise structure configured to be productive of: left-hand elliptical or circular polarized far field electromagnetic radiation; or, right-hand elliptical or circular polarized far field electromagnetic radiation. In an embodiment, one or more of the multiple adjacent signal channels are configured as receive channels of the communication system, where in an embodiment, wherein the receive channels comprise structure configured to be productive of: left-hand elliptical or circular polarized far field electromagnetic radiation; or, right-hand elliptical or circular polarized far field electromagnetic radiation. In an embodiment, one or more of the multiple adjacent signal channels are configured as both transmit and receive channels of the communication system, where in an embodiment, each of the signal channels comprise structure configured to be productive of: left-hand elliptical or circular polarized far field electromagnetic radiation; or, right-hand elliptical or circular polarized far field electromagnetic radiation. In an embodiment, each of the multiple adjacent signal channels are electromagnetically driven by at least one RF frontend chip. In an embodiment, the at least one RF frontend chip is electromagnetically steerable via phase shifting or time delay. In an embodiment, the multiple adjacent signal channels comprise at least, a first set of the signal channels and a second set of the signal channels, wherein the first set of the signal channels are electromagnetically driven by a first dedicated RF frontend chip, and wherein the second set of the signal channels are electromagnetically driven by a second dedicated RF frontend chip. In an embodiment the EM apparatus is configured and disposed in the form of a printed circuit board, PCB, or an electronic packaged assembly. In an embodiment, the at least one RF frontend chip is attached to the back of the PCB or the electronic packaged assembly. In an embodiment, the at least one RF frontend chip is in electromagnetic signal communication with corresponding ones of the DRAs by way of electrically conductive vias from a backside of the PCB or the electronic packaged assembly.

As used herein, the phrase "integrally formed" means a structure formed with material common to the rest of the structure absent material discontinuities from one region of the structure to another, such as a structure produced from a plastic molding process, a 3D printing process, a deposition process, or a machined or forged metal-working process, for example. Alternatively, integrally formed means a unitary one-piece indivisible structure. As used herein, the term "monolithic" means a structure integrally formed from a single material composition. As used herein the phrase "direct intimate contact" means contact with no intervening substance or element therebetween, such as when one part is disposed, deposited, printed, or molded directly onto another part, for example.

As used herein the phrase "composed of a dielectric material other than air" means a dielectric material that may include air, or any other gas suitable for a purpose disclosed herein, but also includes a non-air dielectric medium. In an embodiment, the dielectric material other than air is a dielectric foam.

While embodiments illustrated and described herein may depict Dk EM array structures having or implied to have a specific array size, it will be appreciated that such sizes may be modified without departing from a scope of the invention. As such, any array size that falls within the ambit of the disclosure herein, and is suitable for a purpose disclosed herein, is contemplated and considered to be complementary to the embodiments disclosed herein. While the following example embodiments are individually presented, it will be appreciated from a complete reading of all of the embodiments described herein below that similarities may exist among the individual embodiments that would enable some cross over of features and/or processes. As such, combinations of any of such individual features and/or processes may be employed in accordance with an embodiment, whether or not such combination is explicitly illustrated, while remaining consistent with the disclosure herein. The several figures associated with one or more of the following example embodiments depict an orthogonal set of x-y-z axes that provide a frame of reference for the structural relationship of corresponding features with respect to each other, where an x-y plane coincides with a plan view, and an x-z or y-z plane coincides with an elevation view, of the corresponding embodiments. While embodiments illustrated and described herein depict DRAs having a particular cross-section profile (x-y, x-z, or y-z), it will be appreciated that such profiles may be modified without departing from a scope of the invention. As such, any profile that falls within the ambit of the disclosure herein, and is suitable for a purpose disclosed herein, is contemplated and considered to be complementary to the embodiments disclosed herein.

While certain combinations of individual features have been described and illustrated herein, it will be appreciated that these certain combinations of features are for illustration purposes only and that any combination of any of such individual features may be employed in accordance with an embodiment, whether or not such combination is explicitly illustrated, and consistent with the disclosure herein. Any and all such combinations of features as disclosed herein are contemplated herein, are considered to be within the understanding of one skilled in the art when considering the application as a whole, and are considered to be within the scope of the invention disclosed herein, as long as they fall within the scope of the invention defined by the appended claims, in a manner that would be understood by one skilled in the art.

While an invention has been described herein with reference to example embodiments, it will be understood by those skilled in the art that various changes may be made and equivalents may be substituted for elements thereof without departing from the scope of the claims. Many modifications may be made to adapt a particular situation or material to the teachings of the invention without departing from the essential scope thereof. Therefore, it is intended that the invention not be limited to the particular embodiment or embodiments disclosed herein as the best or only mode contemplated for carrying out this invention, but that the invention will include all embodiments falling within the scope of the appended claims. In the drawings and the description, there have been disclosed example embodiments and, although specific terms and/or dimensions may have been employed, they are unless otherwise stated used in a generic, exemplary and/or descriptive sense only and not for purposes of limitation, the scope of the claims therefore not being so limited. When an element such as a layer, film, region, substrate, or other described feature is referred to as being "on" another element, it can be directly on the other element, or intervening elements may also be present. In contrast, when an element is referred to as being "directly on" another element, there are no intervening elements present. The use of the terms first, second, etc. do not denote any order or importance, but rather the terms first, second, etc. are used to distinguish one element from another. The use of the terms a, an, etc. do not denote a limitation of quantity, but rather denote the presence of at least one of the referenced item. The term "comprising" as used herein does not exclude the possible inclusion of one or more additional features. And, any background information provided herein is provided to reveal information believed by the applicant to be of possible relevance to the invention disclosed herein. No admission is necessarily intended, nor should be construed, that any of such background information constitutes prior art against an embodiment of the invention disclosed herein.

While existing horizontally or vertically linearly polarized radar signals may be suitable for their intended purpose, embodiments disclosed herein provide horizontally or vertically elliptical or circular polarized radar signals having a far field radiation pattern that may be either perpendicular or parallel to ground, which in some embodiments provides an advantage of reversing in polarization on reflection from a metallic object, while not reversing in polarization on reflection from water particles such as rain, thereby providing greater distinction between metallic and non-metallic objects in the reflected radar signals. Stated alternatively, embodiments disclosed herein that are productive of elliptical or circular far field polarization radar signals have the capability of "seeing" metallic objects (such as automobiles for example), and not "seeing" or filtering out water particles (such as rain for example), thereby providing for greater detection accuracy of automobiles traveling in the rain, or other metallic objects in a non-metallic environment. Additionally, embodiments disclosed herein that are productive of elliptical or circular far field polarization radar signals are productive of reflected radar signals that inherently have complex reflection signal signatures when the outgoing radar signal impinges an edge of a metal object, thereby providing greater informational content in the reflected radar signal for more detailed signal processing of the object under surveillance. Further additionally, embodiments disclosed herein having Tx and Rx channels configured with the same polarization sense may be useful for detecting rain particles, as the unreversed reflected radar signal from the Tx channel would be detected by the Rx channel. Thus, a combination of Tx and Rx channels with and without the same polarization sense may be combined to provide a complex and highly informational reflected radar signature. Furthermore, a combination of Tx and Rx channels with x-axis and y-axis oriented arrays, or any angular arrangement therebetween, may be combined to further provide a complex and highly informational reflected radar signature with directional signature content.

The invention claimed is:

1. An electromagnetic device, comprising:
a substrate comprising an elongated aperture having an overall length, L, and an overall width, W, as observed in a plan view of the device, wherein the overall length L is greater than the overall width W;
a dielectric medium comprising a dielectric material other than air disposed on the substrate substantially covering the aperture, the dielectric medium having a cross sectional boundary as viewed in the plan view of the device, the cross sectional boundary having at least one recessed portion that recesses inward toward the aperture from a tangent line that partially bounds the cross sectional boundary;
wherein the length L is not perpendicular to the tangent line.

2. The device of claim 1, wherein the dielectric medium forms at least a portion of a dielectric resonator antenna, DRA.

3. The device of claim 1, wherein the cross-sectional boundary is a cross-sectional outer boundary.

4. The device of claim 1, wherein the aperture is an opening in an electrically conductive layer of the substrate.

5. The device of claim 4, wherein the aperture is an aperture in a substrate integrated waveguide.

6. The device of claim 1, wherein the aperture comprises at least two separate openings in an electrically conductive layer of the substrate.

7. The device of claim 1, wherein the length L is not parallel to the tangent line.

8. The device of claim 1, wherein the length L is oriented at an angle, A, relative to the tangent line, where A is equal to or greater than 10 degrees and equal to or less than 80 degrees.

9. The device of claim 1, wherein the at least one recessed portion defines locations of a first portion of the dielectric medium on one side of the at least one recessed portion and a second portion of the dielectric medium on an opposing side of the at least one recessed portion.

10. The device of claim 9, wherein:
the at least one recessed portion comprises a dielectric material having a first dielectric constant;

the first portion of the dielectric medium comprises a dielectric material having a second dielectric constant;

the second portion of the dielectric medium comprises a dielectric material having a third dielectric constant; and the first dielectric constant is less than the second dielectric constant and less than the third dielectric constant.

11. The device of claim 10, wherein:

the second dielectric constant is substantially equal to the third dielectric constant.

12. The device of claim 9, wherein, as observed in the plan view of the device, a straight line path through the dielectric medium, in a direction parallel to the width W, and through a center point of the aperture, extends through the first and second portions of the dielectric medium, and does not extend through the at least one recessed portion.

13. The device of claim 9, wherein, as observed in the plan view of the device, the first portion has a first maximum overall outside dimension, the second portion has a second maximum overall outside dimension, the first portion and the second portion define a neck therebetween, and the neck has a minimum overall outside dimension that is less than the first and second maximum overall outside dimensions.

14. The device of claim 13, wherein the minimum overall outside dimension of the neck is in a direction that is neither perpendicular nor parallel to the length L of the aperture.

15. The device of claim 13, wherein the first portion, the second portion, and the neck, have a combined outer boundary that is symmetrical with respect to an in-plane axis of reflection.

16. The device of claim 15, wherein the in-plane axis of reflection is substantially orthogonal to the minimum overall outside dimension of the neck.

17. The device of claim 13, wherein the minimum overall outside dimension of the neck traverses the elongated aperture along a traversal path that extends across the elongated aperture from one side of the elongated aperture to the other, the minimum overall outside dimension of the neck being greater than a straight line length of the traversal path.

18. The device of claim 17, wherein the traversal path extends across the elongated aperture in a direction that is neither perpendicular nor parallel to the length L of the aperture.

19. The device of claim 17, wherein the minimum overall outside dimension of the neck is greater than the straight line length of the traversal path with a defined minimum of dielectric material of the dielectric medium disposed on each of two sides of the elongated aperture.

20. The device of claim 19, wherein the defined minimum of dielectric material of the dielectric medium is equal to or less than ⅓ of the minimum overall outside dimension of the neck.

21. The device of claim 9, wherein, as observed in the plan view of the device, at least one of the first portion and the second portion has an outwardly curved outer boundary.

22. The device of claim 9, wherein, as observed in the plan view of the device, at least one of the first portion and the second portion has at least one linear outer boundary.

23. The device of claim 1, wherein the at least one recessed portion comprises two recessed portions.

24. The device of claim 23, wherein the two recessed portions are substantially mirror images of each other.

25. The device of claim 1, wherein the dielectric medium is a first dielectric medium having a first dielectric constant, and further comprising:

a second dielectric medium having a second dielectric constant that is different from the first dielectric constant, the second dielectric medium disposed at least partially outboard of and at least partially enclosing the first dielectric medium.

26. The device of claim 25, wherein the second dielectric constant is lower than the first dielectric constant.

27. The device of claim 25, wherein:

the first dielectric medium and the second dielectric medium are in direct intimate contact with each other.

* * * * *